US010566608B2

(12) United States Patent
Miki et al.

(10) Patent No.: US 10,566,608 B2
(45) Date of Patent: *Feb. 18, 2020

(54) NEGATIVE ELECTRODE FOR ELECTRIC DEVICE AND ELECTRIC DEVICE USING THE SAME

(71) Applicant: NISSAN MOTOR CO., LTD., Yokohama-shi, Kanagawa-ken (JP)

(72) Inventors: Fumihiro Miki, Sagamihara (JP); Manabu Watanabe, Yokosuka (JP); Kensuke Yamamoto, Yokohama (JP); Takashi Sanada, Yokohama (JP); Nobutaka Chiba, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/442,661

(22) PCT Filed: Nov. 19, 2013

(86) PCT No.: PCT/JP2013/081117
§ 371 (c)(1),
(2) Date: May 13, 2015

(87) PCT Pub. No.: WO2014/080886
PCT Pub. Date: May 30, 2014

(65) Prior Publication Data
US 2016/0285077 A1    Sep. 29, 2016

(30) Foreign Application Priority Data
Nov. 22, 2012  (JP) .................................. 2012-256937

(51) Int. Cl.
*H01M 4/134*    (2010.01)
*C22C 13/00*    (2006.01)
(Continued)

(52) U.S. Cl.
CPC ............. *H01M 4/134* (2013.01); *C01B 33/00* (2013.01); *C04B 35/013* (2013.01);
(Continued)

(58) Field of Classification Search
CPC .... H01M 4/134; H01M 4/136; H01M 4/0426; H01M 4/386; H01M 4/387; H01M 4/621;
(Continued)

(56) References Cited

U.S. PATENT DOCUMENTS 6,300,013 B1    10/2001    Yamada et al.
6,685,804 B1    2/2004    Ikeda et al.
(Continued)

FOREIGN PATENT DOCUMENTS

CN    1272698 A    11/2000
CN    1444301 A    9/2003
(Continued)

OTHER PUBLICATIONS

U.S. Appl. No. 14/646,242, filed May 20, 2015, Nissan Motor Co., LTD.
(Continued)

*Primary Examiner* — Karie O'Neill Apicella
(74) *Attorney, Agent, or Firm* — Foley & Lardner LLP

(57) ABSTRACT

The negative electrode for an electric device includes a current collector and an electrode layer containing a negative electrode active material, a conductive auxiliary agent and a binder and formed on a surface of the current collector, wherein the negative electrode active material contains an alloy represented by the following formula (1): $Si_xSn_yM_zA_a$ (in the formula (1), M is at least one metal selected from the group consisting of Al, V, C and a combination thereof, A is inevitable impurities, and x, y, z and a represent mass percent values and satisfy the conditions of $0<x<100$,
(Continued)

$0<y<100$, $0<z<100$, $0 \leq a<0.5$, and $x+y+z+a=100$), and elastic elongation of the current collector is 1.30% or greater.

11 Claims, 16 Drawing Sheets

(51) Int. Cl.

| | |
|---|---|
| C22C 30/04 | (2006.01) |
| H01M 4/38 | (2006.01) |
| H01M 10/052 | (2010.01) |
| C22C 24/00 | (2006.01) |
| C22C 29/18 | (2006.01) |
| C22C 30/00 | (2006.01) |
| C22C 1/04 | (2006.01) |
| C04B 35/01 | (2006.01) |
| H01M 4/04 | (2006.01) |
| C01B 33/00 | (2006.01) |
| C22C 1/10 | (2006.01) |
| C22C 27/02 | (2006.01) |
| H01M 4/136 | (2010.01) |
| H01M 10/0525 | (2010.01) |
| H01M 4/62 | (2006.01) |
| H01M 4/66 | (2006.01) |
| H01M 4/02 | (2006.01) |

(52) U.S. Cl.
CPC .......... *C22C 1/0416* (2013.01); *C22C 1/0483* (2013.01); *C22C 1/1036* (2013.01); *C22C 1/1084* (2013.01); *C22C 13/00* (2013.01); *C22C 24/00* (2013.01); *C22C 27/025* (2013.01); *C22C 29/18* (2013.01); *C22C 30/00* (2013.01); *C22C 30/04* (2013.01); *H01M 4/0426* (2013.01); *H01M 4/136* (2013.01); *H01M 4/386* (2013.01); *H01M 4/387* (2013.01); *H01M 10/052* (2013.01); *H01M 10/0525* (2013.01); *C01P 2006/40* (2013.01); *C04B 2235/3203* (2013.01); *C04B 2235/3275* (2013.01); *C04B 2235/3279* (2013.01); *H01M 4/621* (2013.01); *H01M 4/624* (2013.01); *H01M 4/661* (2013.01); *H01M 4/662* (2013.01); *H01M 4/663* (2013.01); *H01M 4/668* (2013.01); *H01M 2004/021* (2013.01); *H01M 2004/027* (2013.01); *H01M 2220/20* (2013.01); *Y02E 60/122* (2013.01); *Y02T 10/7011* (2013.01)

(58) Field of Classification Search
CPC .. H01M 4/624; H01M 4/661; H01M 10/0525; C22C 30/04; C22C 13/00; C22C 27/025; C22C 1/1084; C22C 1/1036; C01B 33/00
See application file for complete search history.

(56) References Cited

U.S. PATENT DOCUMENTS

| | | |
|---|---|---|
| 6,699,336 B2 | 3/2004 | Turner et al. |
| 7,141,187 B2 | 11/2006 | Kosuzu et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,316,792 B2 | 1/2008 | Kosuzu et al. |
| 7,410,728 B1 | 8/2008 | Fujimoto et al. |
| 7,479,351 B2 | 1/2009 | Matsubara et al. |
| 7,732,095 B2 | 6/2010 | Christensen et al. |
| 7,794,881 B1 | 9/2010 | Fujimoto et al. |
| 7,803,290 B2 | 9/2010 | Kosuzu et al. |
| 7,811,709 B2 | 10/2010 | Musha et al. |
| 7,851,086 B2 | 12/2010 | Matsubara et al. |
| 7,972,727 B2 | 7/2011 | Christensen et al. |
| 8,221,918 B2 | 7/2012 | Katsura et al. |
| 9,325,003 B2 | 4/2016 | Watanabe et al. |
| 9,603,245 B2 | 3/2017 | Suzuki et al. |
| 2002/0044800 A1 | 4/2002 | Kimura |
| 2003/0157407 A1 | 8/2003 | Kosuzu et al. |
| 2004/0029012 A1 | 2/2004 | Tanizaki et al. |
| 2005/0208379 A1 | 9/2005 | Musha et al. |
| 2005/0244711 A1* | 11/2005 | Fukui ............... H01M 4/134 429/217 |
| 2006/0035149 A1 | 2/2006 | Nanba et al. |
| 2006/0040182 A1 | 2/2006 | Kawakami et al. |
| 2006/0051675 A1 | 3/2006 | Musha et al. |
| 2006/0115735 A1 | 6/2006 | Yasuda et al. |
| 2007/0048612 A1 | 3/2007 | Nakajima et al. |
| 2007/0128517 A1 | 6/2007 | Christensen et al. |
| 2007/0148544 A1 | 6/2007 | Le |
| 2007/0200101 A1 | 8/2007 | Asao et al. |
| 2009/0061322 A1 | 3/2009 | Kawakami et al. |
| 2009/0297951 A1 | 12/2009 | Katsura et al. |
| 2010/0075226 A1 | 3/2010 | Pham et al. |
| 2010/0119942 A1* | 5/2010 | Kumar ............... H01M 4/38 429/220 |
| 2010/0167126 A1 | 7/2010 | Christensen et al. |
| 2010/0178571 A1 | 7/2010 | Nanba et al. |
| 2010/0270497 A1 | 10/2010 | Hezeque et al. |
| 2010/0288077 A1 | 11/2010 | Le |
| 2010/0323098 A1 | 12/2010 | Kosuzu et al. |
| 2011/0052985 A1 | 3/2011 | Kashiwazaki et al. |
| 2011/0183209 A1 | 7/2011 | Christensen et al. |
| 2012/0153220 A1 | 6/2012 | Watanabe et al. |
| 2012/0175551 A1 | 7/2012 | Watanabe et al. |
| 2012/0200200 A1 | 8/2012 | Jung et al. |
| 2013/0108922 A1 | 5/2013 | Shinozaki et al. |
| 2013/0202967 A1 | 8/2013 | Kim et al. |
| 2013/0288122 A1* | 10/2013 | Matsushima ........ H01M 4/13 429/211 |
| 2013/0341560 A1 | 12/2013 | Watanabe et al. |
| 2014/0017564 A1 | 1/2014 | Suzuki et al. |
| 2014/0086788 A1 | 3/2014 | Watanabe et al. |
| 2014/0086792 A1 | 3/2014 | Watanabe et al. |
| 2014/0099229 A1 | 4/2014 | Watanabe et al. |
| 2014/0353546 A1 | 12/2014 | Watanabe et al. |
| 2014/0374666 A1 | 12/2014 | Watanabe et al. |
| 2015/0295228 A1 | 10/2015 | Yamamoto et al. |
| 2015/0303450 A1 | 10/2015 | Miki et al. |
| 2015/0303455 A1 | 10/2015 | Watanabe et al. |
| 2015/0303464 A1 | 10/2015 | Watanabe et al. |
| 2015/0303465 A1 | 10/2015 | Watanabe et al. |
| 2016/0285077 A1 | 9/2016 | Miki et al. |
| 2016/0285088 A1 | 9/2016 | Watanabe et al. |

FOREIGN PATENT DOCUMENTS

| | | |
|---|---|---|
| CN | 1765024 A | 4/2006 |
| CN | 101179126 A | 5/2008 |
| CN | 101233632 A | 7/2008 |
| CN | 101593828 A | 12/2009 |
| CN | 102326284 A | 1/2012 |
| CN | 104170127 A | 11/2014 |
| EP | 2 717 357 A1 | 4/2014 |
| EP | 2 800 176 A1 | 11/2014 |
| JP | 2000-113885 A | 4/2000 |
| JP | 2000-299108 A | 10/2000 |
| JP | 2001-196052 A | 7/2001 |
| JP | 2002-083594 A | 3/2002 |
| JP | 2003-331826 A | 11/2003 |
| JP | 2004-178922 A | 6/2004 |
| JP | 2004-185810 A | 7/2004 |
| JP | 2004-185984 A | 7/2004 |
| JP | 2004-228059 A | 8/2004 |
| JP | 2004-311429 A | 11/2004 |
| JP | 2005-044672 A | 2/2005 |
| JP | 2005-078999 A | 3/2005 |
| JP | 2005-116390 A | 4/2005 |
| JP | 2006-216277 A | 8/2006 |
| JP | 2007-026805 A | 2/2007 |
| JP | 2007-026926 A | 2/2007 |

(56) References Cited

FOREIGN PATENT DOCUMENTS

| | | | | |
|---|---|---|---|---|
| JP | 2007-149604 | A | 6/2007 | |
| JP | 2007-305424 | A | 11/2007 | |
| JP | 2009-032644 | A | 2/2009 | |
| JP | 2009-517850 | A | 4/2009 | |
| JP | 2009-224239 | | 10/2009 | |
| JP | 2010-135336 | A | 6/2010 | |
| JP | 2010-205609 | A | 9/2010 | |
| JP | 2011-048969 | A | 3/2011 | |
| JP | 2012-033475 | A | 2/2012 | |
| JP | 2012-151106 | A | 8/2012 | |
| JP | 2012-185913 | A | 9/2012 | |
| JP | 2012248286 | A * | 12/2012 | ............. H01M 4/38 |
| JP | 2013-161785 | A | 8/2013 | |
| KR | 10-2003-0041816 | A | 5/2003 | |
| KR | 10-2005-0075449 | A | 7/2005 | |
| KR | 10-2008-0032037 | A | 4/2008 | |
| WO | WO 2004/004031 | A1 | 1/2004 | |
| WO | WO-2004/086539 | A1 | 10/2004 | |
| WO | WO-2007/015508 | A1 | 2/2007 | |
| WO | WO-2008/097723 | A1 | 8/2008 | |
| WO | WO-2010/150513 | A1 | 12/2010 | |
| WO | WO-2011/065503 | A1 | 6/2011 | |
| WO | WO-2011/065504 | A1 | 6/2011 | |
| WO | WO-2012/121240 | A1 | 9/2012 | |
| WO | WO-2012/160858 | A1 | 11/2012 | |
| WO | WO-2012/160866 | A1 | 11/2012 | |
| WO | WO-2012/161190 | A1 | 11/2012 | |
| WO | WO-2013/055646 | A1 | 4/2013 | |
| WO | WO-2013/099440 | A1 | 7/2013 | |
| WO | WO-2013/099441 | A1 | 7/2013 | |

OTHER PUBLICATIONS

USPTO Office Action, U.S. Appl. No. 14/646,590, dated Jul. 21, 2017, 33 pages.
Hatchard et al., "Electrochemical Performance of SiAlSn Films Prepared by Combinatorial Sputtering," Electrochemical and Solid-State Letters, vol. 6, No. 7, 2003, pp. A129-A132.
M. A. Al-Maghrabi et al., A Combinatorial Study of the Sn—Si—C System for Li-Ion Battery Applications, Journal of the Electrochemical Society, vol. 159, No. 6, Apr. 2, 2012, pp. A711-A719.
Machine translation of JP 2004-311429,Nov. 4, 2004, 33 pages.
Taiwanese Office Action, dated Mar. 19, 2014, 4 pages.
USPTO Office Action, U.S. Appl. No. 14/119,379, dated Jan. 7, 2016, 6 pages.
USPTO Office Action, U.S. Appl. No. 14/119,379, dated Apr. 15, 2016, 7 pages.
USPTO Office Action, U.S. Appl. No. 14/119,379, dated Oct. 9, 2015, 8 pages.
USPTO Office Action, U.S. Appl. No. 14/119,379, dated Feb. 10, 2015, 8 pages.
USPTO Office Action, U.S. Appl. No. 14/119,379, dated May 18, 2015, 7 pages.
USPTO Office Action, U.S. Appl. No. 14/442,957, dated Dec. 19, 2016, 14 pages.
USPTO Office Action, U.S. Appl. No. 14/443,151, dated Jun. 13, 2016, 12 pages.
USPTO Office Action, U.S. Appl. No. 14/443,151, dated Nov. 28, 2016, 16 pages.
USPTO Office Action, U.S. Appl. No. 14/443,572, dated Oct. 14, 2016, 25 pages.
USPTO Office Action, U.S. Appl. No. 14/443,852, dated Oct. 17, 2016, 17 pages.
USPTO Office Action, U.S. Appl. No. 14/443,852, dated Dec. 29, 2016, 14 pages.
USPTO Office Action, U.S. Appl. No. 14/646,218, dated Oct. 14, 2016, 22 pages.
USPTO Office Action, U.S. Appl. No. 14/646,590, dated Dec. 4, 2017, 22 pages.
USPTO Office Action, U.S. Appl. No. 14/646,242, dated Apr. 19, 2018, 11 pages.
USPTO Office Action, U.S. Appl. No. 14/646,590, dated May 8, 2018, 22 pages.
USPTO Office Action, U.S. Appl. No. 14/646,242, dated Jan. 11, 2018, 21 pages.
USPTO Office Action, U.S. Appl. No. 14/646,242, dated Aug. 10, 2018, 11 pages.
USPTO Office Action, U.S. Appl. No. 14/646,590, dated Aug. 28, 2018, 23 pages.
USPTO Notice of Allowance, U.S. Appl. No. 14/119,379, dated Mar. 13, 2019, 12 pages.
USPTO Office Action, U.S. Appl. No. 14/646,242, dated Jan. 7, 2019, 18 pages.
USPTO Office Communication, Decision on Appeal, U.S. Appl. No. 14/119,379, dated Feb. 6, 2019, 9 pages.
USPTO Office Action, U.S. Appl. No. 14/646,242, dated Jun. 26, 2019, 10 pages.
USPTO Office Action, U.S. Appl. No. 14/646,242, dated Oct. 21, 2019, 12 pages.

* cited by examiner

NEGATIVE ELECTRODE FOR ELECTRIC DEVICE AND ELECTRIC DEVICE USING THE SAME

TECHNICAL FIELD

The present invention relates to a negative electrode for an electric device and an electric device using the same. In particular, the negative electrode for an electric device and the electric device using the same according to the present invention are used for a driving power source and an auxiliary power source of a motor serving as, for example, a secondary battery or a capacitor for use in a vehicle such as an electric vehicle, a fuel cell vehicle and a hybrid electric vehicle.

BACKGROUND ART

There has been a strong demand for reduction of the amount of carbon dioxide in order to deal with atmospheric pollution and global warming. In the automobile industry, the reduction of emissions of carbon dioxide is highly expected in association with the spread of electric vehicles (EV) and hybrid electric vehicles (HEV). Thus, development of electric devices such as secondary batteries for driving motors as a key to practical application of such vehicles, is actively being carried out.

The secondary batteries for driving motors are required to have quite high output performance and high energy as compared with lithium ion secondary batteries for general use in mobile phones, laptop computers and the like. Therefore, lithium ion secondary batteries having the highest theoretical energy among all types of batteries are gaining increasing attention, which is leading to rapid development of the lithium ion secondary batteries.

A lithium ion secondary battery generally includes: a positive electrode including a positive electrode current collector to which a positive electrode active material and the like is applied on both surfaces via a binder, a negative electrode including a negative electrode current collector to which a negative electrode active material and the like is applied on both surfaces via a binder, and an electrolyte layer, the positive electrode and the negative electrode being connected to each other via the electrolyte layer and housed in a battery case.

In such a conventional lithium ion secondary battery, a carbon/graphite-based material having the advantage of charge-discharge cycle life or costs has been used for the negative electrode. However, the carbon/graphite-based negative electrode material has the disadvantage that a sufficient theoretical charge-discharge capacity of 372 mAh/g or higher obtained from $LiC_6$ as a lithium introduction compound accounting for the largest amount, cannot be ensured because the battery is charged/discharged by absorbing lithium ions into graphite crystals and releasing the lithium ions therefrom. As a result, it is difficult to ensure a capacity and energy density sufficient to satisfy vehicle usage on the practical level by use of the carbon/graphite-based negative electrode material.

On the other hand, a battery using a material alloyed with Li for a negative electrode has higher energy density than the conventional battery using the carbon/graphite-based negative electrode material. Therefore, such a negative electrode material is highly expected to be used for a battery in a vehicle. For example, 1 mole of a Si material absorbs and releases 4.4 moles of lithium ions, in accordance with the following reaction formula (A), during charge and discharge, and a theoretical capacity of $Li_{22}Si_5$ ($=Li_{4.4}Si$) is 2100 mAh/g. Further, the Si material has an initial capacity as high as 3200 mAh/g in the case of calculation per Si weight.

[Chem. 1]

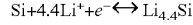

$$Si + 4.4Li^+ + e^- \leftrightarrow Li_{4.4}Si \qquad A$$

However, in the lithium ion secondary battery using the material alloyed with Li for the negative electrode, expansion-shrinkage in the negative electrode at the time of charge and discharge is large. For example, volumetric expansion of the graphite material in the case of absorbing Li ions is approximately 1.2 times. However, the Si material has a problem of a reduction in cycle life of the electrode due to a large volumetric change (approximately 4 times) which is caused by transition from an amorphous state to a crystal state when Si is alloyed with Li. In addition, when using the Si negative electrode active material, a capacity has a trade-off relationship with cycle durability. Thus, it is difficult to increase the capacity and improve the cycle durability concurrently.

In order to deal with the problems described above, there is known a negative electrode active material for a lithium ion secondary battery containing an amorphous alloy having a formula: $Si_xM_yAl_z$ (for example, refer to Patent Document 1). In the formula, x, y, and z represent atomic percent values and satisfy the conditions of $x+y+z=100$, $x \geq 55$, $y < 22$, and $z > 0$, and M is a metal formed of at least one of Mn, Mo, Nb, W, Ta, Fe, Cu, Ti, V, Cr, Ni, Co, Zr, and Y. Patent Document 1 teaches in paragraph [0018] that good cycle life is ensured in addition to a high capacity by minimizing the content of the metal M.

CITATION LIST

Patent Document

Patent Document 1: Japanese Translation of PCT International Application Publication No. JP-T-2009-517850

SUMMARY OF THE INVENTION

Technical Problem

In the case of using the lithium ion secondary battery including the negative electrode containing the amorphous alloy having the formula: $Si_xM_yAl_z$, as disclosed in Patent Document 1, although good cycle property can be exhibited, an initial capacity is not ensured sufficiently. Further, the cycle property is not very satisfactory to the lithium ion secondary battery.

An object of the present invention is to provide a negative electrode for an electric device such as a Li ion secondary battery capable of exhibiting well-balanced characteristics of a high cycle property and a high initial capacity.

Solution to Problem

The inventors of the present invention devoted themselves to continuous studies to solve the conventional problems. As a result, the inventors found out that it is possible to solve the problems by using a predetermined ternary Si alloy as a negative electrode active material and further using a negative electrode current collector having predetermined elastic elongation to accomplish the present invention.

The present invention relates to a negative electrode for an electric device, including a current collector and an electrode layer containing a negative electrode active material, a conductive auxiliary agent and a binder and formed on a surface of the current collector. The negative electrode active material is an alloy represented by the following formula (1).

[Chem. 2]

$$Si_xSn_yM_zA_a \qquad (1)$$

in addition, elastic elongation of the current collector is 1.30% or greater. In the formula (1), M is at least one metal selected from the group consisting of Al, V, C and a combination thereof, A is an inevitable impurity. Further, x, y, z and a represent mass percent values and satisfy the conditions of $0<x<100$, $0<y<100$, $0<z<100$, $0\le a<0.5$, and $x+y+z+a=100$.

DESCRIPTION OF EMBODIMENTS

Figure 1:
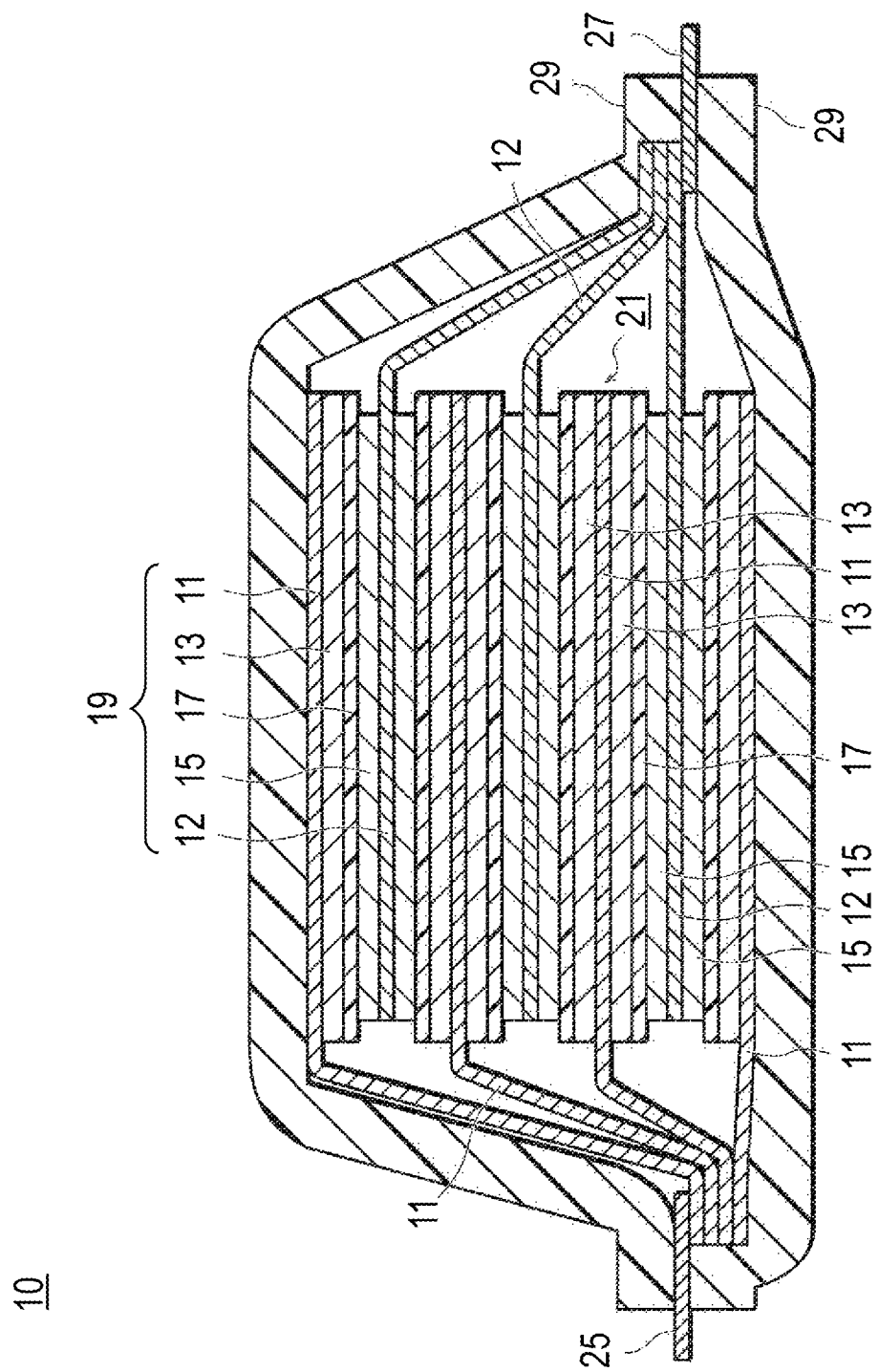
FIG. 1 is a cross-sectional view schematically showing an outline of a laminated-type flat non-bipolar lithium ion secondary battery which is a typical embodiment of an electric device according to the present invention.

As described above, the present invention is characterized by using a predetermined ternary Si alloy as a negative electrode active material and using a negative electrode current collector having predetermined elastic elongation.

According to the present invention, when the predetermined Si alloy is used as a negative electrode active material, amorphous-crystal phase transition is suppressed when Si is alloyed with Li so as to improve a cycle property. Further, in a negative electrode using the predetermined Si alloy, the current collector having predetermined elastic elongation can be elastically deformed by following a volumetric change of a negative electrode active material layer due to expansion-contraction of the negative electrode active material in association with charge and discharge of the battery. Thus, plastic deformation of the current collector hardly occurs, and a distortion of the negative electrode active material layer caused by the plastic deformation of the current collector can be prevented so as to keep an even distance between the negative electrode and the positive electrode. Accordingly, an electric device having a high capacity and cycle durability can be ensured.

Hereinafter, the embodiment of a negative electrode for an electric device and an electric device using the same according to the present invention will be explained with reference to the drawings. It should be noted that the technical scope of the present invention should be defined based on the appended claims and is not limited to the embodiment described below. In the description of the drawings, the same elements are indicated by the same reference numerals, and overlapping explanations thereof are not repeated. In addition, dimensional ratios in the drawings are magnified for convenience of explanation and may be different from actual ratios.

Hereinafter, a fundamental configuration of the electric device to which the negative electrode for an electric device according to the present invention is applied will be explained with reference to the drawings. In the present embodiment, a lithium ion secondary battery is exemplified as the electric device. Note that, in the present invention, "an electrode layer" represents a compound layer including a negative electrode active material, a conductive auxiliary agent and a binder and is also referred to as "a negative electrode active material layer" in the explanation of the present specification. Similarly, an electrode layer on the positive electrode side is also referred to as "a positive electrode active material layer".

In a negative electrode for a lithium ion secondary battery, which is a typical embodiment of the negative electrode for an electric device according to the present invention and a lithium ion secondary battery using the same, a cell (single cell layer) has large voltage so that high energy density and high output density can be ensured. Thus, the lithium ion secondary battery using the negative electrode for a lithium ion secondary battery according to the present embodiment is suitable for a driving power source or an auxiliary power source for a vehicle and is therefore desirable to be used as a lithium ion secondary battery for a driving power source and the like for use in a vehicle. Further, the present invention can be applied appropriately to lithium ion secondary batteries for mobile devices such as mobile phones.

In other words, other constituent requirements in the lithium ion secondary battery as an object of the present embodiment are not particularly limited as long as the lithium ion secondary battery is obtained by use of the negative electrode for a lithium ion secondary battery according to the present embodiment described below.

For example, when the lithium ion secondary battery is differentiated from other batteries in terms of the shape and structure, the lithium ion secondary battery may be applicable to any batteries having known shapes and structures such as a laminated (flat) battery and a wound (cylindrical) battery. The structure of the laminated (flat) battery contributes to ensuring long-term reliability by a simple sealing technology such as thermo-compression bonding and therefore has the advantage of costs and workability.

In terms of electrical connection (electrode structure) inside the lithium ion secondary battery, the lithium ion secondary battery may be applicable not only to a non-bipolar (internal parallel connection type) battery but also to a bipolar (internal serial connection type) battery.

When the lithium ion secondary battery is differentiated from other batteries in terms of the type of an electrolyte layer used therein, the lithium ion secondary battery may be applicable to batteries including various types of known electrolyte layers such as a solution electrolyte battery in which a solution electrolyte such as a non-aqueous electrolyte liquid is used for an electrolyte layer and a polymer battery in which a polymer electrolyte is used for an electrolyte layer. The polymer battery is classified into a gel electrolyte battery using a polymer gel electrolyte (also simply referred to as a gel electrolyte) and a solid polymer (all solid state) battery using a polymer solid electrolyte (also simply referred to as a polymer electrolyte).

Therefore, in the following explanation, a non-bipolar (internal parallel connection type) lithium ion secondary battery using the negative electrode for a lithium ion secondary battery according to the present embodiment will be explained briefly with reference to the drawings. However, the technical scope of the lithium ion secondary battery according to the present embodiment should not be limited to the following explanations.

<Entire Configuration of Battery>

FIG. 1 is a schematic cross-sectional view showing the entire configuration of a flat (laminated) lithium ion secondary battery (hereinafter, also simply referred to as a "laminated battery") which is a typical embodiment of the electric device according to the present invention.

As shown in FIG. 1, a laminated battery 10 according to the present embodiment has a configuration in which a substantially rectangular power generation element 21, in which a charge-discharge reaction actually progresses, is sealed inside a laminated sheet 29 as a battery exterior member. The power generation element 21 has a configuration in which positive electrodes, electrolyte layers 17 and negative electrodes are stacked, each positive electrode having a configuration in which positive electrode active material layers 13 are provided on both surfaces of a positive electrode current collector 11, each negative electrode having a configuration in which negative electrode active material layers 15 are provided on both surfaces of a negative electrode current collector 12. In other words, several sets of the positive electrode, the electrolyte layer and the negative electrode arranged in this order are stacked on top of each other in a manner such that one positive electrode active material layer 13 faces one negative electrode active material layer 15 with the electrolyte layer 17 interposed therebetween.

The positive electrode, the electrolyte layer and the negative electrode that are adjacent to one another thus constitute a single cell layer 19. Thus, the laminated battery 10 shown in FIG. 1 has a configuration in which the plural single cell layers 19 are stacked on top of each other so as to be electrically connected in parallel. Here, the positive electrode current collectors located on both outermost layers of the power generation element 21 are each provided with the positive electrode active material layer 13 only on one side thereof. Alternatively, the outermost positive electrode current collectors may each be provided with the positive electrode active material layers 13 on both sides thereof. That is, the current collectors each provided with the positive electrode active material layers on both sides thereof may be used as the respective outermost layers, in addition to the case where the current collectors each provided with the positive electrode active material layer 13 only on one side thereof are used as the respective outermost layers. Similarly, the negative electrode current collectors each provided with the negative electrode active material layer on one side or both sides thereof, may be located on the respective outermost layers of the power generation element 21 in a manner such that the positions of the positive electrodes and the negative electrodes shown in FIG. 1 are reversed.

A positive electrode current collecting plate 25 and a negative electrode current collecting plate 27 which are electrically conductive to the respective electrodes (the positive electrodes and the negative electrodes) are attached to the positive electrode current collectors 11 and the negative electrode current collectors 12, respectively. The positive electrode current collecting plate 25 and the negative electrode current collecting plate 27 are held by the respective end portions of the laminated sheet 29 and exposed to the outside of the laminated sheet 29. The positive electrode current collecting plate 25 and the negative electrode current collecting plate 27 may be attached to the positive electrode current collectors 11 and the negative electrode current collectors 12 of the respective electrodes via a positive electrode lead and a negative electrode lead (not shown in the figure) as appropriate by, for example, ultrasonic welding or resistance welding.

The lithium ion secondary battery described above is characterized by the negative electrode. Main constituent members of the battery including the negative electrode will be explained below.

<Positive Electrode>

[Positive Electrode Active Material Layer]

The positive electrode active material layer 13 contains a positive electrode active material and other additives as necessary.

(Positive Electrode Active Material)

Examples of the positive electrode active material include a lithium-transition metal composite oxide, a lithium-transition metal phosphate compound, a lithium-transition metal sulfated compound, a solid solution series material, a ternary series material, an NiMn series material, an NiCo series material, and a spinel-manganese series material.

Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$, and an oxide in which part of the transition metal contained in each of these composite oxides is substituted with other elements.

Examples of the solid solution series material include $xLiMO_2 \cdot (1-x)Li_2NO_3$ (where $0<x<1$, M represents at least one transition metal in an average oxidation state of 3+, and N represents at least one transition metal in an average oxidation state of 4+), and $LiRO_2$—$LiMn_2O_4$ (where R represents a transition metal element such as Ni, Mn, Co, and Fe).

The ternary series material may be a nickel-cobalt-manganese composite positive electrode material.

The NiMn series material may be $LiNi_{0.5}Mn_{1.5}O_4$.

The NiCo series material may be $Li(NiCo)O_2$.

The spinel-manganese series material may be $LiMn_2O_4$.

Two or more kinds of the positive electrode active materials may be combined together according to circumstances. In view of a capacity and output performance, the lithium-transition metal composite oxide is preferably used for the positive electrode active material. Note that other positive electrode active materials not listed above can, of course, be used instead. In the case that the respective active materials require different particle diameters in order to achieve their own appropriate effects, the active materials having different particle diameters may be selected and mixed together so as to optimally function to achieve their own effects. Thus, it is not necessary to equalize the particle diameter of all of the active materials.

An average particle diameter of the positive electrode active material contained in the positive electrode active material layer 13 is not particularly limited; however, in view of higher output performance, the average particle diameter is preferably in the range from 1 μm to 30 μm, more preferably in the range from 5 μm to 20 μm. Note that, in the present specification, "the particle diameter" represents the greatest length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may also be determined in the same manner.

The positive electrode (the positive electrode active material layer) may be formed by a method of applying (coating) ordinary slurry thereto, or by any of a kneading method, a sputtering method, a vapor deposition method, a CVD method, a PVD method, an ion plating method, and a thermal spraying method.

<Positive Electrode Current Collector>

The positive electrode current collector 11 is made from an electrically conductive material. The size of the current collector may be determined depending on the intended use of the battery. For example, a current collector having a large area is used for a large-size battery for which high energy density is required.

The thickness of the current collector is not particularly limited. The thickness is generally approximately in the range from 1 μm to 100 μm.

The shape of the current collector is not particularly limited. The laminated battery 10 shown in FIG. 1 may use a current collecting foil or a mesh current collector (such as an expanded grid).

The material used for the current collector is not particularly limited. For example, a metal or resin in which electrically conductive filler is added to an electrically conductive polymer material or a non-conductive polymer material may be used.

Examples of the metal include aluminum, nickel, iron, stainless steel, titanium and copper. In addition, a clad metal of nickel and aluminum, a clad metal of copper and aluminum, or an alloyed material of these metals combined together, may be preferably used. A foil in which a metal surface is covered with aluminum may also be used.

Examples of the electrically conductive polymer material include polyaniline, polypyrrole, polythiophene, polyacetylene, polyparaphenylene, polyphenylene vinylene, polyacrylonitrile and polyoxadiazole. These electrically conductive polymer materials have the advantage in simplification of the manufacturing process and lightness of the current collector, since these materials have sufficient electric conductivity even if electrically conductive filler is not added thereto.

Examples of the non-conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). These non-conductive polymer materials have high potential resistance or solvent resistance.

The electrically conductive polymer material or the non-conductive polymer material may include electrically conductive filler that is added as necessary. In particular, when the resin serving as a substrate of the current collector only contains a non-conductive polymer, the electrically conductive filler is essential to impart electric conductivity to the resin.

The electrically conductive filler is not particularly limited as long as it is a substance having electric conductivity. Examples of the material having high electric conductivity, potential resistance or lithium ion insulation property, include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. The electrically conductive carbon is not particularly limited; however, the electrically conductive carbon is preferably at least one material selected from the group consisting of acetylene black, Vulcan, Black Pearls, carbon nanofiber, Ketjenblack, carbon nanotube, carbon nanohorn, carbon nanoballoon, and fullerene.

The amount of the electrically conductive filler added in the current collector is not particularly limited as long as it imparts sufficient electric conductivity to the current collector. In general, the amount thereof is approximately in the range from 5 to 35% by mass.

<Negative Electrode>

The negative electrode according to the present embodiment is characterized by including a current collector and an electrode layer provided on each surface of the current collector and containing a particular negative electrode active material, a conductive auxiliary agent and a binder, and characterized in that elastic elongation of the current collector is 1.30% or higher.

[Negative Electrode Active Material Layer]

The negative electrode active material layer 15 contains a negative electrode active material and other additives as necessary.

(Negative Electrode Active Material)

The negative electrode active material contains a predetermined alloy.

Alloy

The alloy according to the present embodiment is represented by the following chemical formula (1).

[Chem. 3]

$$Si_xSn_yM_zA_a \quad (1)$$

In the formula (1), M is at least one metal selected from the group consisting of Al, V, C, and a combination thereof, and A represents inevitable impurities. Further, x, y, z and a represent mass percent values and satisfy the conditions of $0<x<100$, $0<y<100$, $0<z<100$, $0\leq a<0.5$, and $x+y+z+a=100$. Note that, in the present specification, the "inevitable impurities" described above are substances in the Si alloy which are derived from the raw materials or inevitably mixed in the production process. The inevitable impurities contained are essentially unnecessary but permissible substances, since the amount thereof is quite small and there is no influence on the characteristics of the Si alloy.

In the present embodiment, a first additive element Sn and a second additive element M (at least one metal selected from the group consisting of Al, V, C, and a combination thereof) are selected as a negative electrode active material so as to suppress amorphous-crystal phase transition at the time of the alloying with Li and extend cycle life. Accordingly, the negative electrode active material thus obtained has a higher capacity than conventional negative electrode active materials such as carbon-based negative electrode active materials.

The reason the amorphous-crystal phase transition should be suppressed at the time of the alloying with Li is that the function as an active material is lost by breakage of particles per se due to a large volumetric change (approximately 4 times) in the Si material which is caused by transition from an amorphous state to a crystal state when Si is alloyed with Li. In other words, the suppression of the amorphous-crystal phase transition can prevent breakage of the particles per se, secure the function as an active material (high capacity) and extend cycle life. The first and second additive elements selected as described above can provide the Si alloy negative electrode active material having a high capacity and cycle durability.

As described above. M is at least one metal selected from the group consisting of Al, V, C, and a combination thereof. The following are the details of the Si alloy having each of compositions $Si_xSn_yAl_zA_a$, $Si_xSn_yV_zA_a$, and $Si_xSn_yC_zA_a$.

$Si_xSn_yAl_zA_a$

The composition $Si_xSn_yAl_zA_a$ obtained by selecting Sn as a first additive element and Al as a second additive element as described above can suppress the amorphous-crystal phase transition at the time of the alloying with Li so as to extend cycle life. Accordingly, the negative electrode active material thus obtained has a higher capacity than conventional negative electrode active materials such as carbon-based negative electrode active materials.

Figure 3:
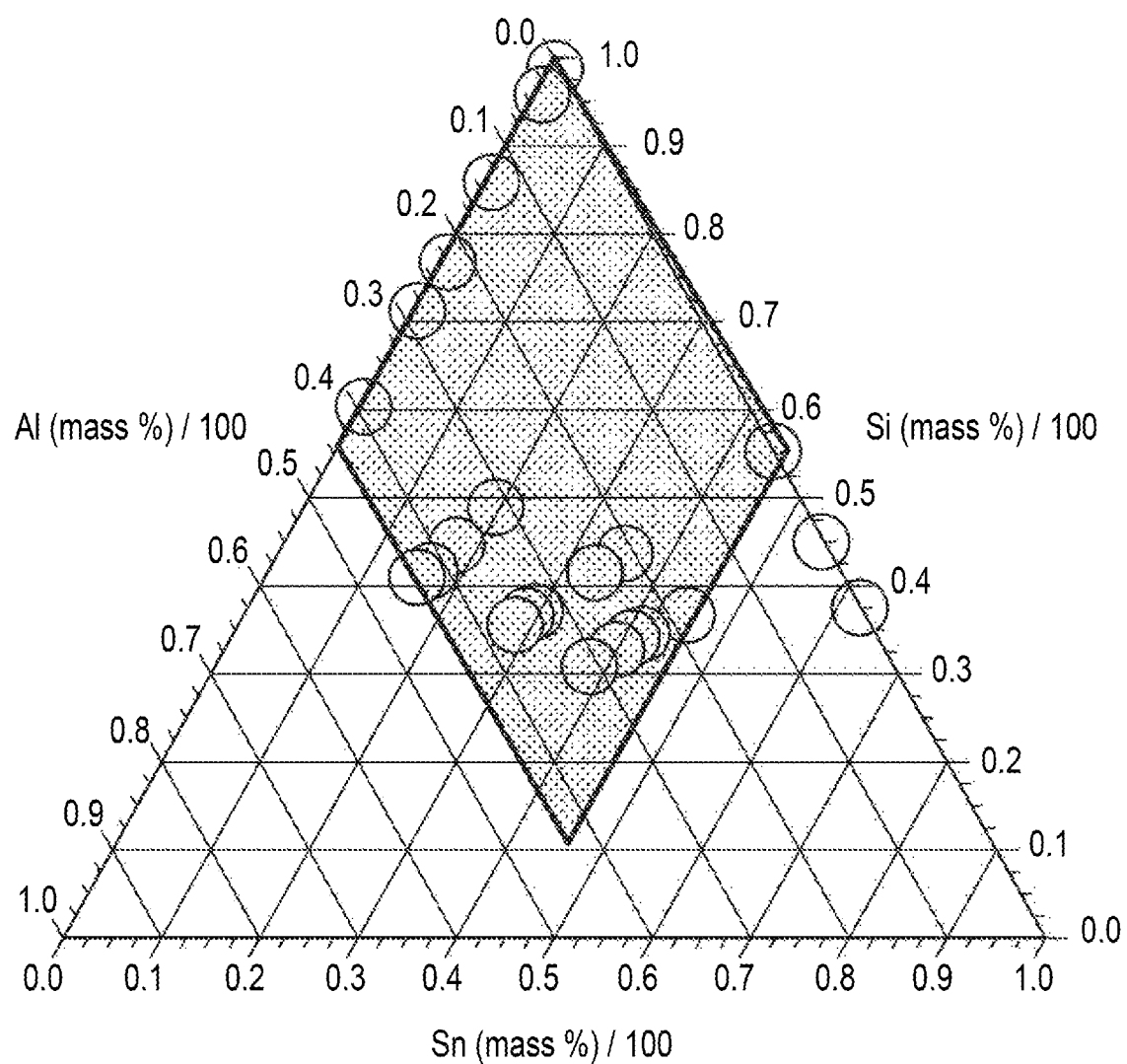
FIG. 3 is a ternary composition diagram showing composition ranges of a Si—Sn—Al series alloy contained in a negative electrode active material included in a negative electrode for an electric device according to the present invention, wherein alloy compositions obtained in Reference Example A are plotted.

In the alloy composition described above, x is preferably 12 or greater and less than 100, y is preferably greater than 0 and 45 or less, and z is preferably greater than 0 and 43 or less. The composition ranges of this alloy correspond to the area indicated by hatching in FIG. 3. The alloy having this composition not only can exhibit a high capacity but also can keep a high discharge capacity even after 50 cycles and 100 cycles.

Figure 4:
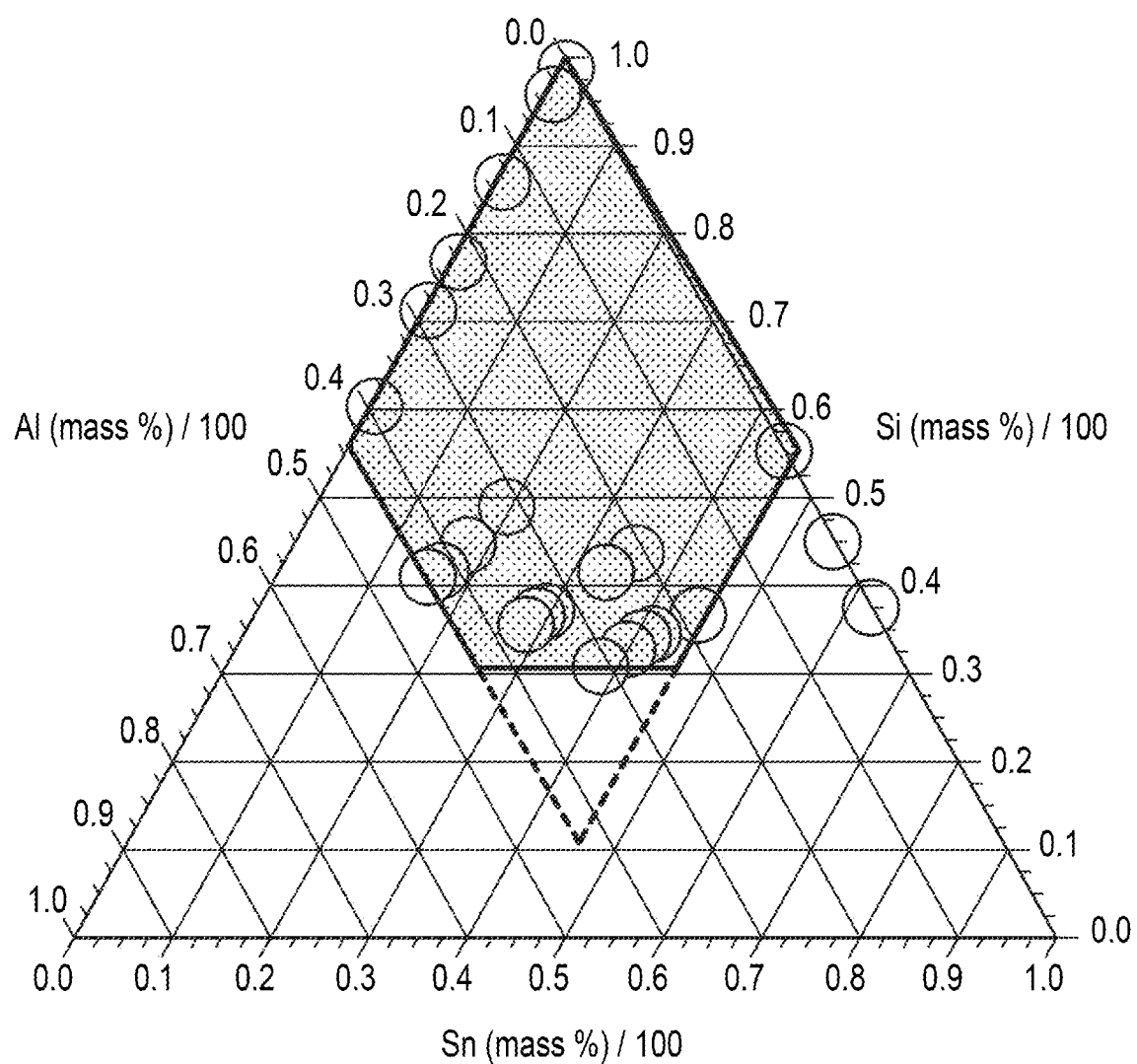
FIG. 4 is a ternary composition diagram showing preferable composition ranges of the Si—Sn—Al series alloy contained in the negative electrode active material included in the negative electrode for an electric device according to the present invention.
Figure 5:
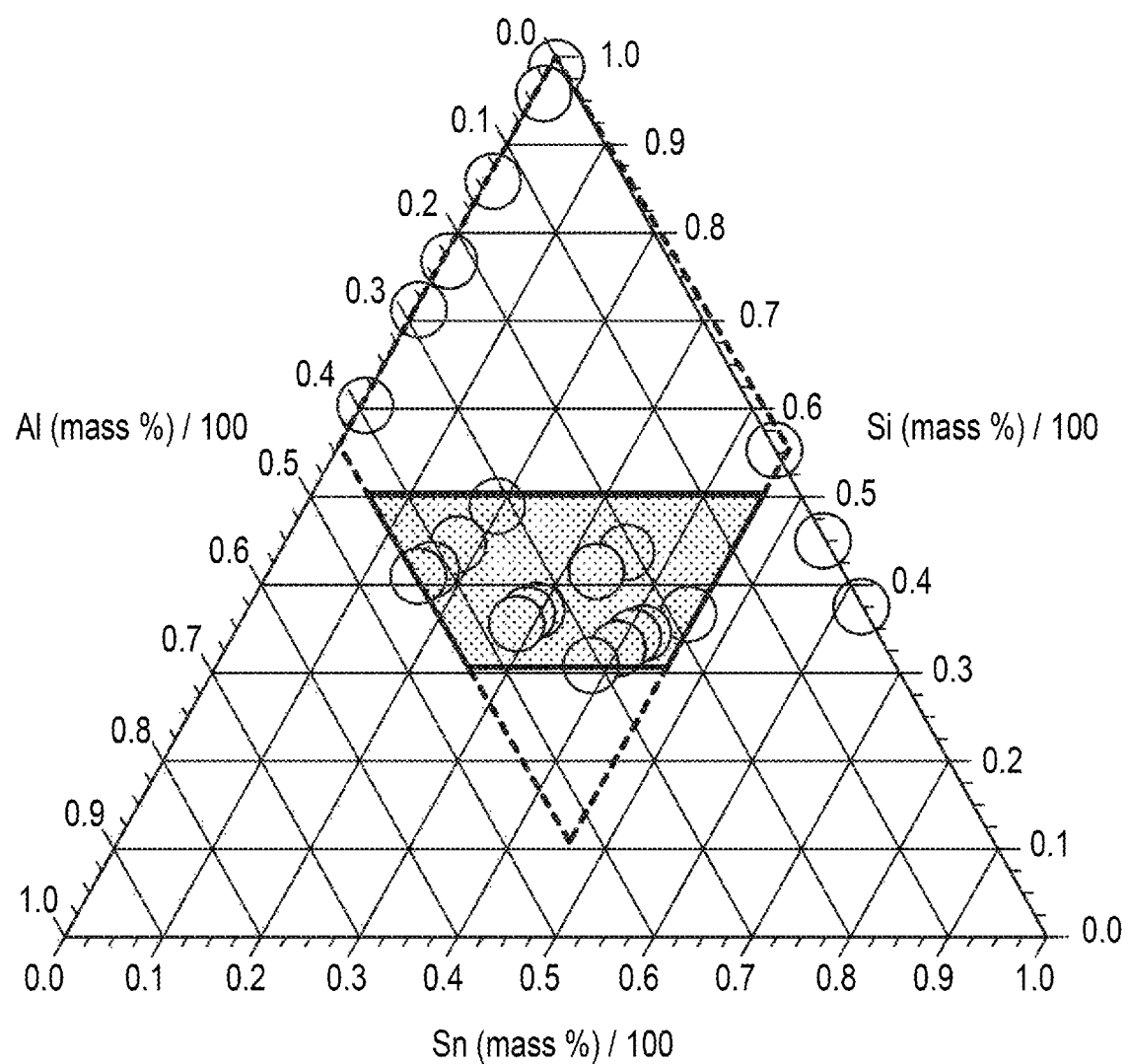
FIG. 5 is a ternary composition diagram showing more preferable composition ranges of the Si—Sn—Al series alloy contained in the negative electrode active material included in the negative electrode for an electric device according to the present invention.
Figure 6:
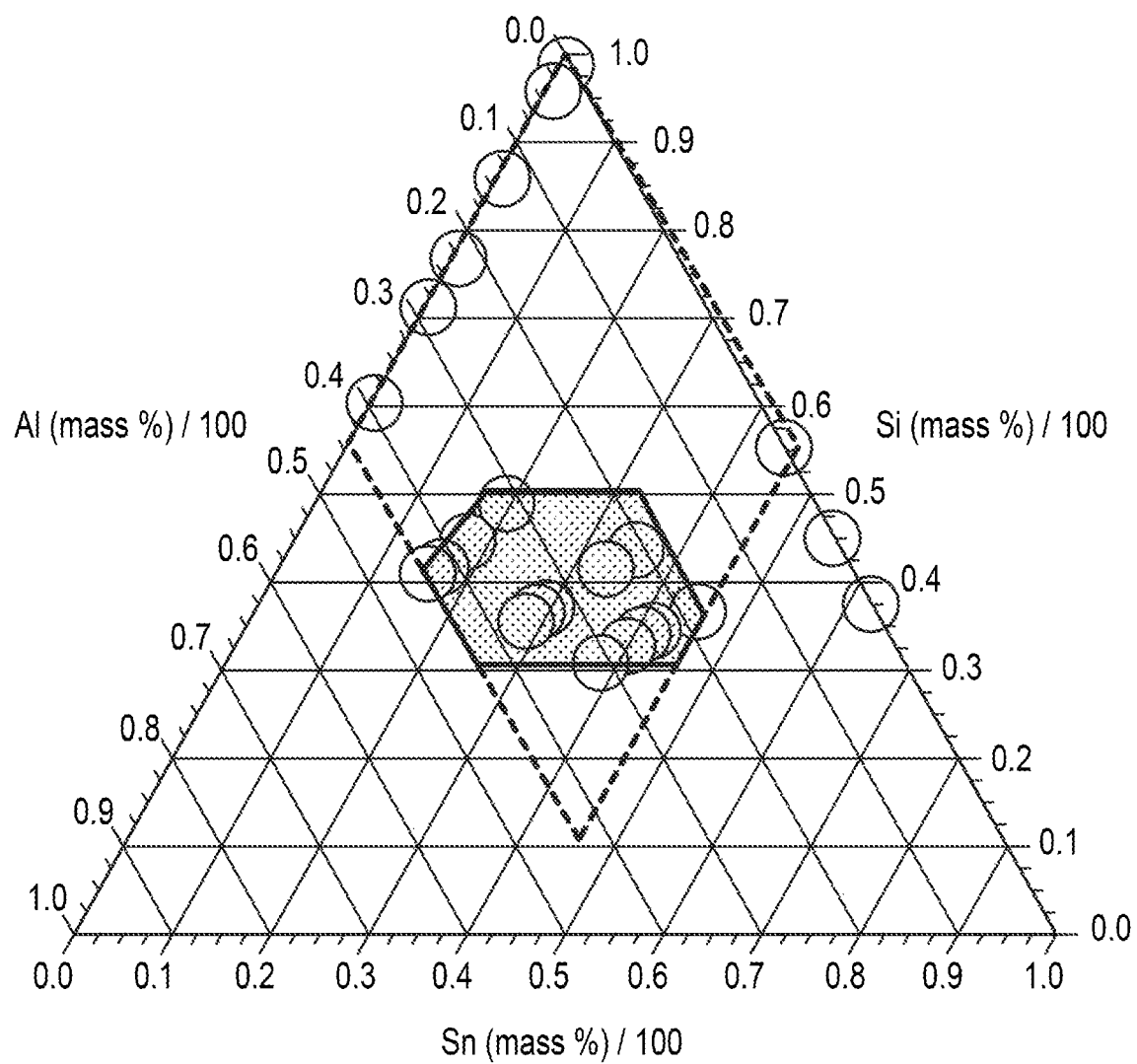
FIG. 6 is a ternary composition diagram showing still more preferable composition ranges of the Si—Sn—Al series alloy contained in the negative electrode active material included in the negative electrode for an electric device according to the present invention.

In order to further improve the above-described characteristics of the negative electrode active material, x is preferably 31 or greater as shown in the hatched area of FIG. 4. More preferably, x is in the range from 31 to 50 as shown in the hatched area of FIG. 5. Still more preferably, y is in the range from 15 to 45 and z is in the range from 18 to 43% as shown in the hatched area of FIG. 6. Most preferably, x is in the range from 16% to 45%.

As described above, A is impurities (inevitable impurities) derived from the raw materials or the production process other than the three components described above, where a satisfies $0\leq a<0.5$, preferably $0\leq a<0.1$.

$Si_xSn_yV_zA_a$

The composition $Si_xSn_yV_zA_a$ obtained by selecting Sn as a first additive element and V as a second additive element as described above can suppress the amorphous-crystal phase transition at the time of the alloying with Li so as to extend cycle life. Accordingly, the negative electrode active material thus obtained has a higher capacity than conventional negative electrode active materials such as carbon-based negative electrode active materials.

Figure 7:
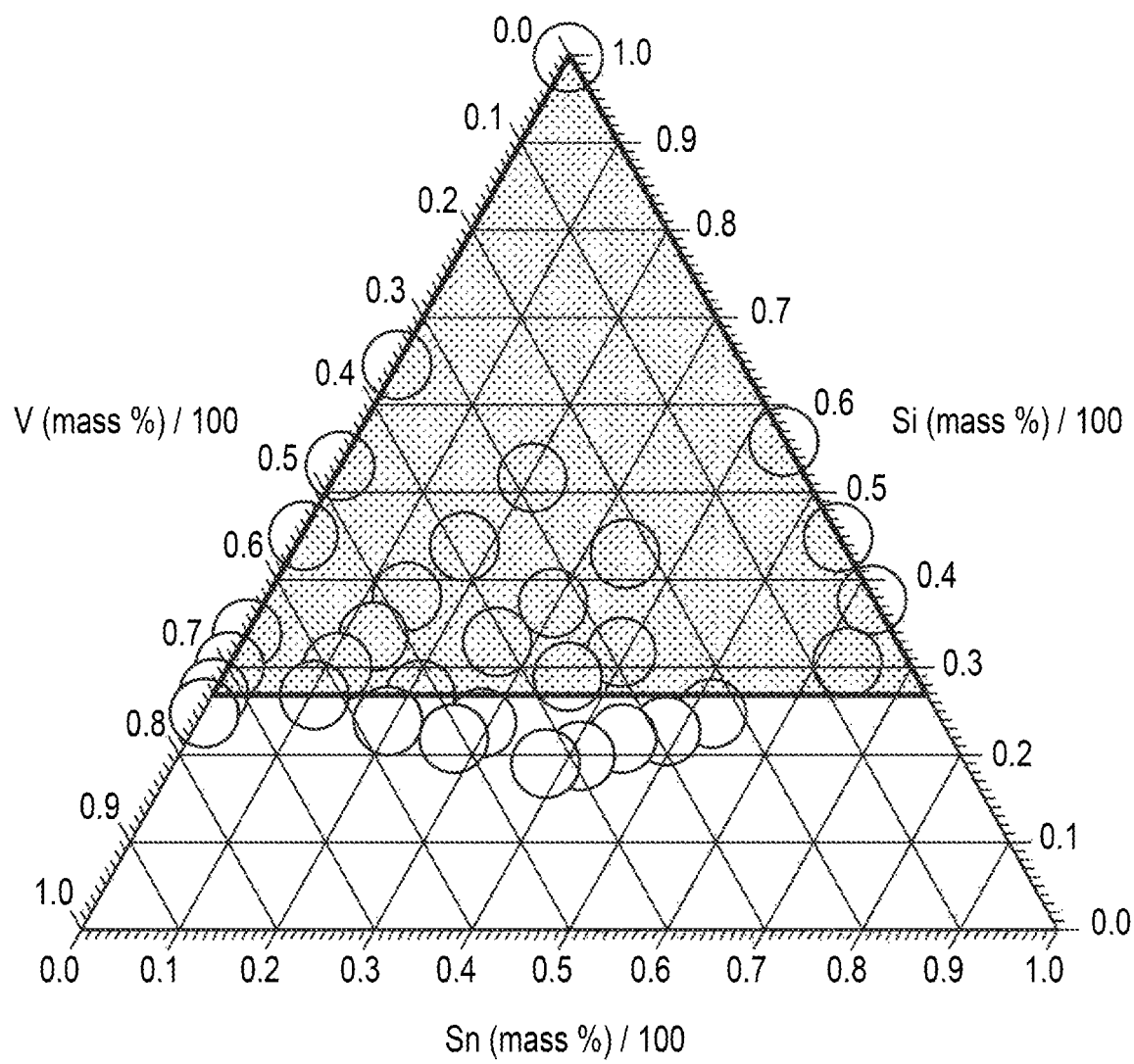
FIG. 7 is a ternary composition diagram showing composition ranges of a Si—Sn—V series alloy contained in the negative electrode active material included in the negative electrode for an electric device according to the present invention, wherein alloy compositions obtained in Reference Example B are plotted.

In the alloy composition described above, x is preferably 27 or greater and less than 100, y is preferably greater than 0 and 73 or less, and z is preferably greater than 0 and 73 or less. These numerical ranges correspond to the area indicated by hatching in FIG. 7. The alloy having this composition not only can exhibit a high capacity but also can keep a high discharge capacity even after 50 cycles and 100 cycles.

Figure 8:
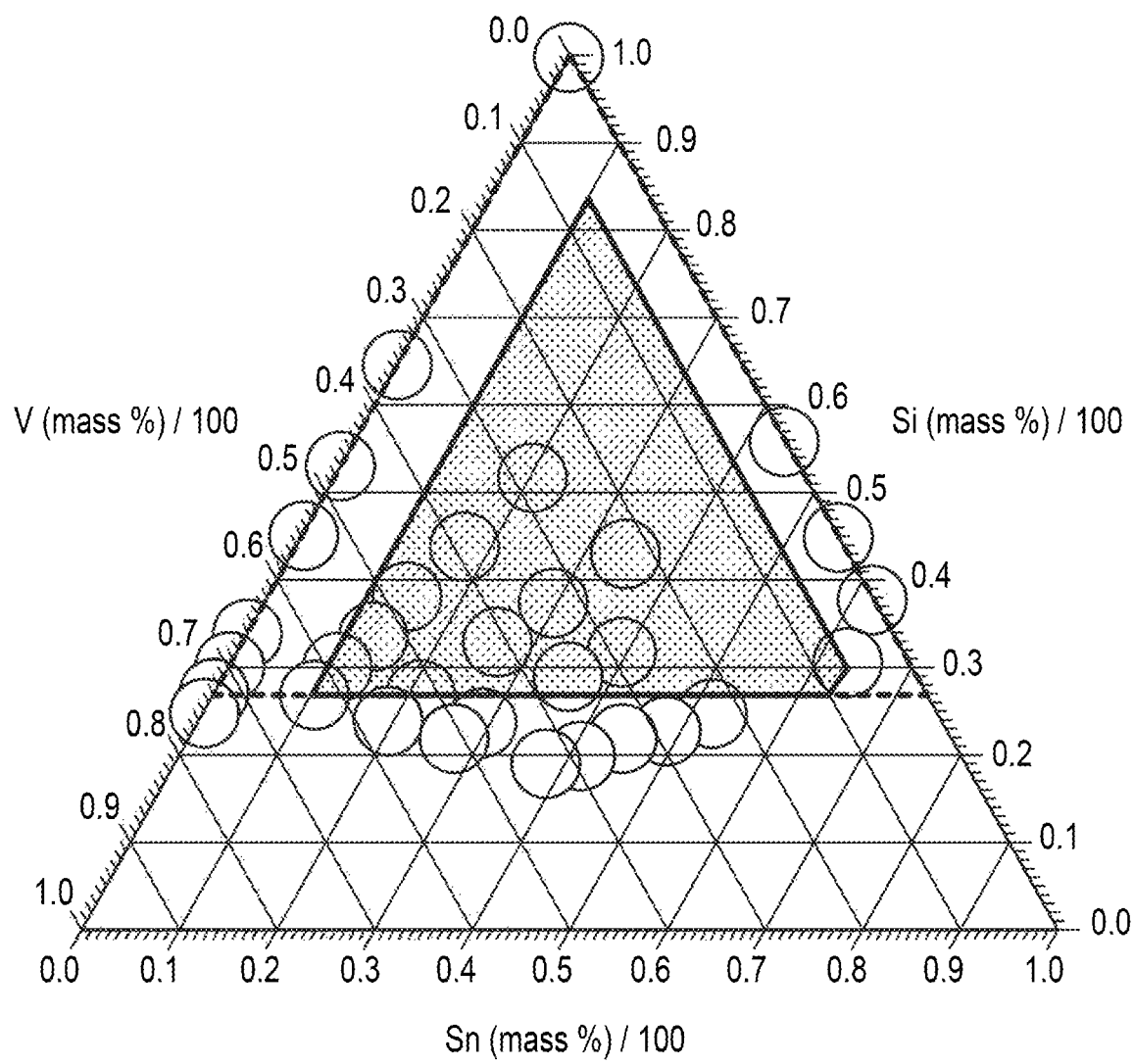
FIG. 8 is a ternary composition diagram showing preferable composition ranges of the Si—Sn—V series alloy contained in the negative electrode active material included in the negative electrode for an electric device according to the present invention.
Figure 9:
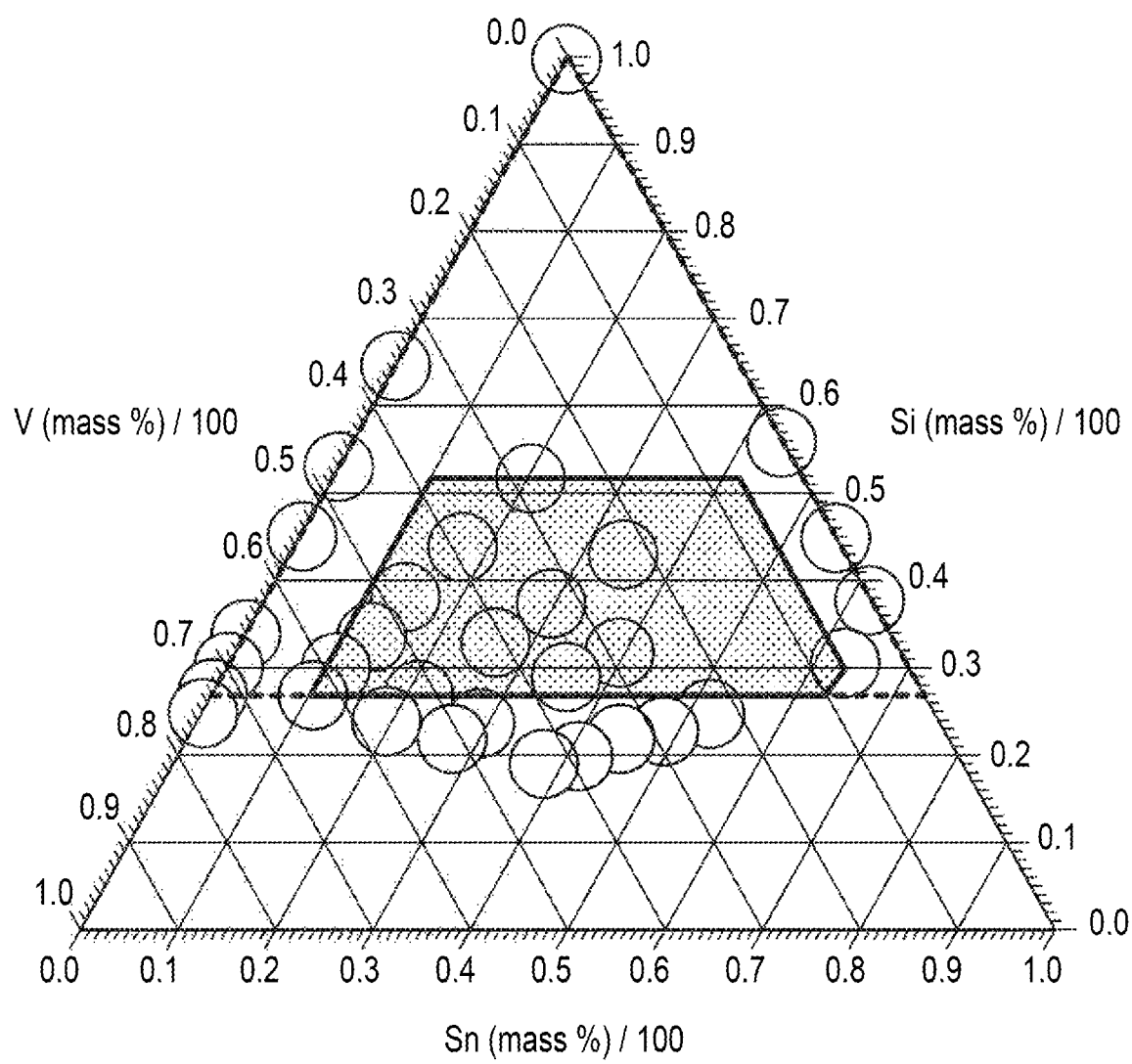
FIG. 9 is a ternary composition diagram showing more preferable composition ranges of the Si—Sn—V series alloy contained in the negative electrode active material included in the negative electrode for an electric device according to the present invention.
Figure 10:
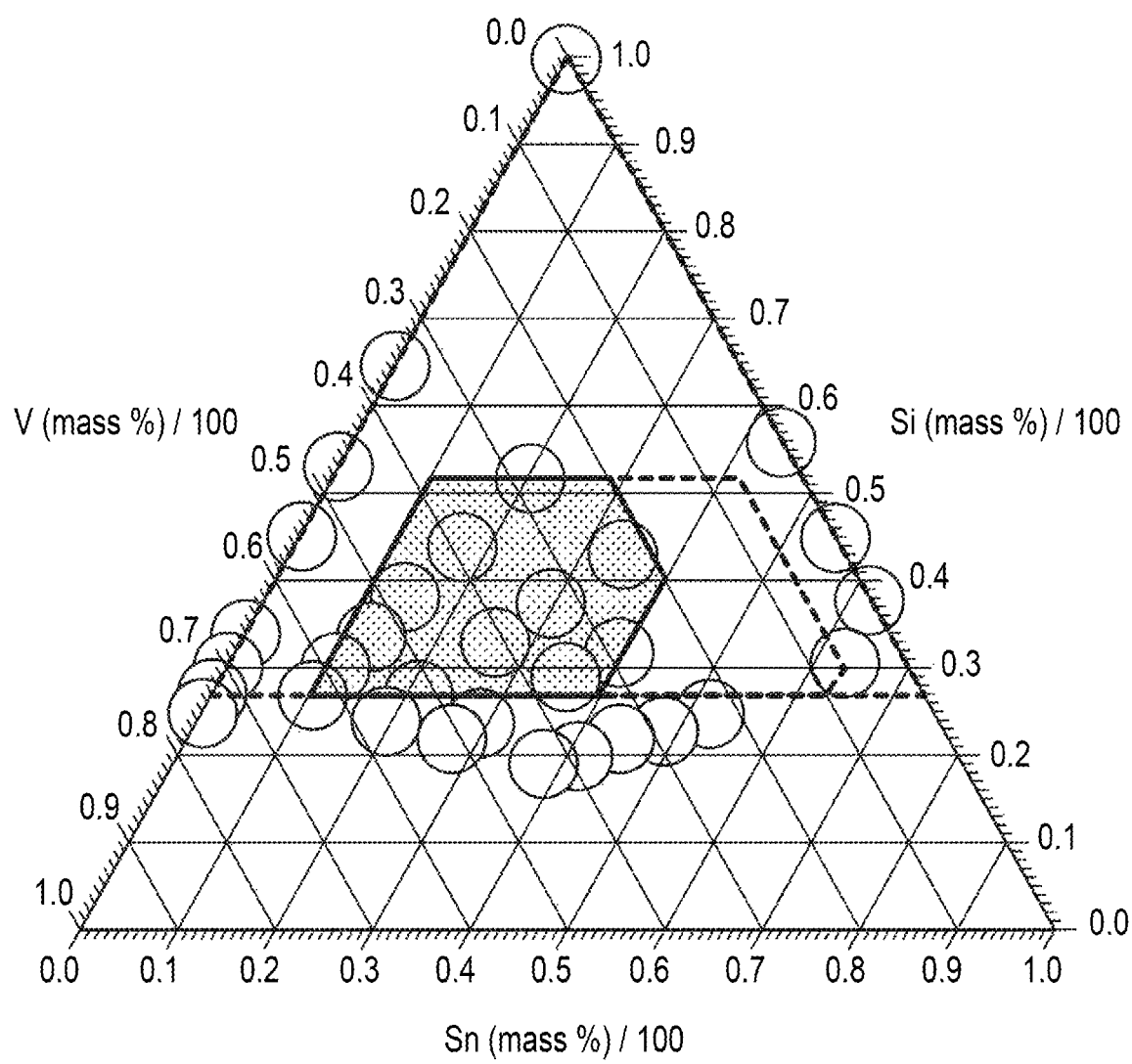
FIG. 10 is a ternary composition diagram showing still more preferable composition ranges of the Si—Sn—V series alloy contained in the negative electrode active material included in the negative electrode for an electric device according to the present invention.

In order to further improve the above-described characteristics of the negative electrode active material, x is preferably in the range from 27 to 84, y is preferably in the range from 10 to 73, and z is preferably in the range from 6 to 73. More preferably, x is in the range from 27 to 84, y is in the range from 10 to 63, and z is in the range from 6 to 63, as shown in the hatched area of FIG. 8. Still more preferably, x is in the range from 27 to 52 as shown in the hatched area of FIG. 9. Particularly preferably, y is in the range from 10 to 52 and z is in the range from 20 to 63 as shown in the hatched area of FIG. 10. Most preferably, y is in the range from 10 to 40.

Here, a satisfies $0 \le a < 0.5$, preferably $0 \le a < 0.1$.

$Si_xSn_yC_zA_a$

The composition $Si_xSn_yC_zA_a$ obtained by selecting Sn as a first additive element and C as a second additive element as described above can suppress the amorphous-crystal phase transition at the time of the alloying with Li so as to extend cycle life. Accordingly, the negative electrode active material thus obtained has a higher capacity than conventional negative electrode active materials such as carbon-based negative electrode active materials.

In the alloy composition described above, x is preferably 29 or greater. The numerical ranges of this alloy correspond to the area indicated by sign A in FIG. 11. The alloy having this composition not only can exhibit a high capacity but also can keep a high discharge capacity even after 50 cycles and 100 cycles.

Figure 12:
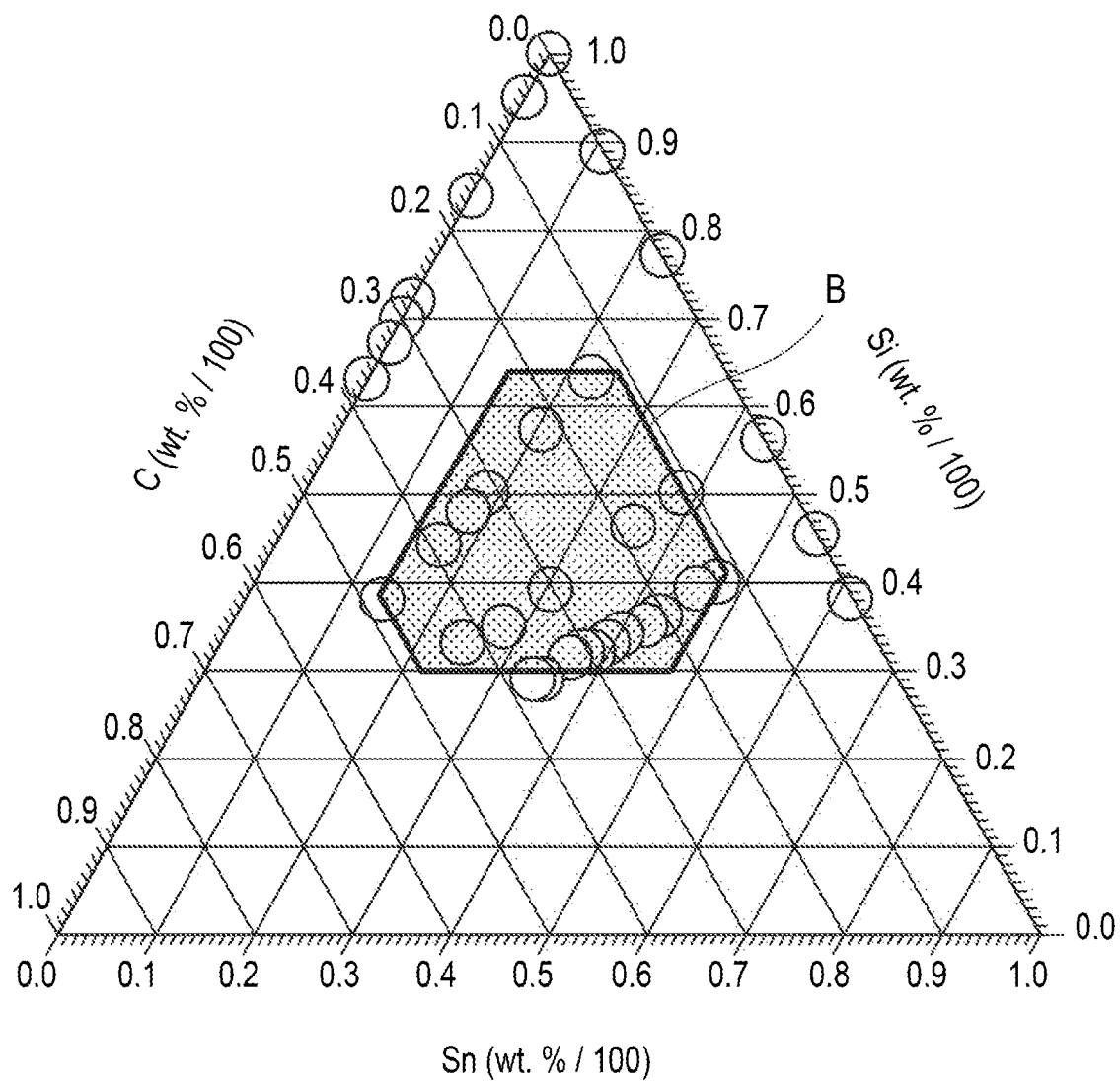
FIG. 12 is a ternary composition diagram showing preferable composition ranges of the Si—Sn—C series alloy contained in the negative electrode active material included in the negative electrode for an electric device according to the present invention.

In order to still further improve the above-described characteristics of the negative electrode active material, x is preferably in the range from 29 to 63, y is preferably in the range from 14 to 48, and z is preferably in the range from 11 to 48 These numerical ranges correspond to the area indicated by sign B in FIG. 12.

Figure 13:
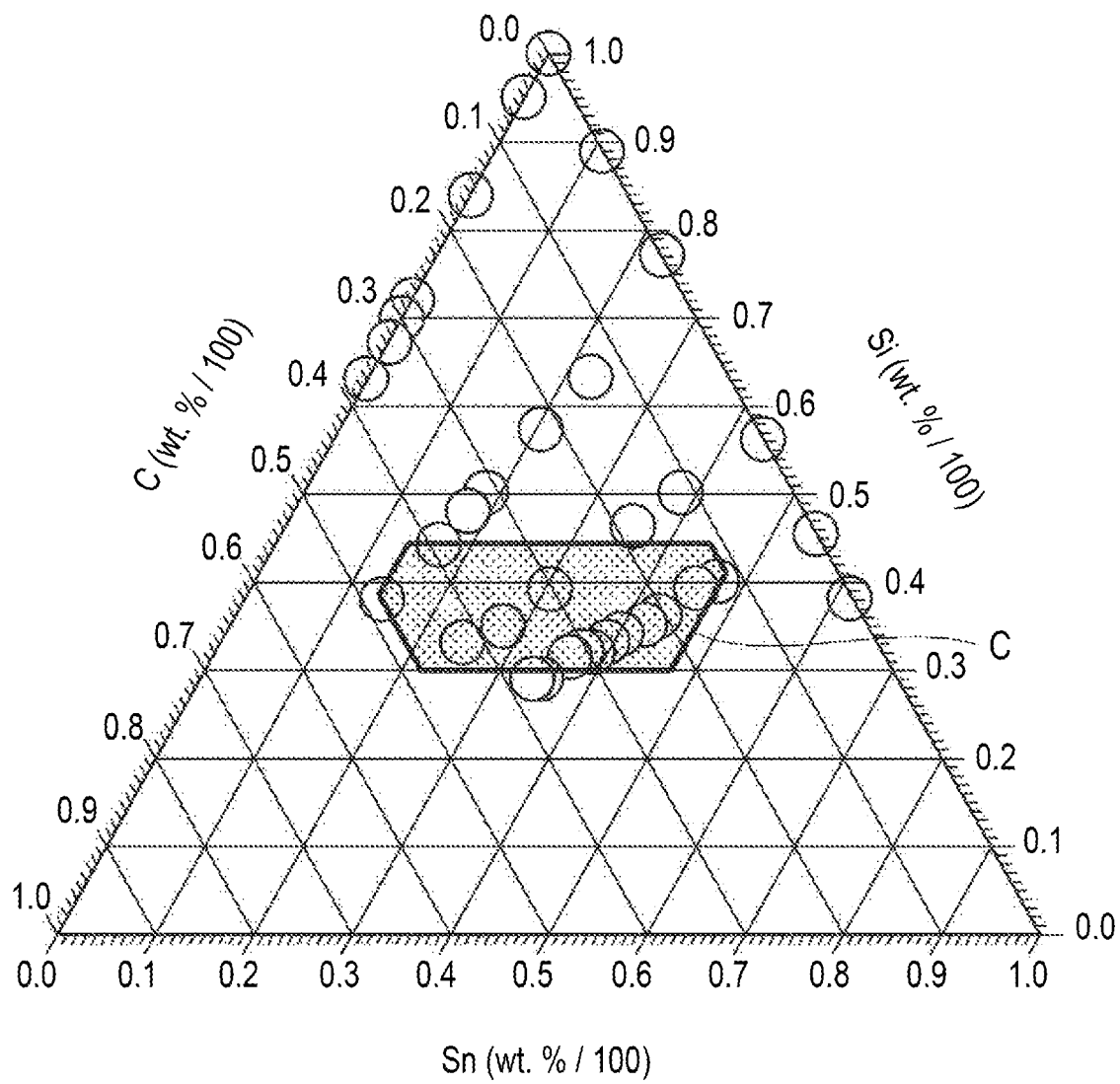
FIG. 13 is a ternary composition diagram showing more preferable composition ranges of the Si—Sn—C series alloy contained in the negative electrode active material included in the negative electrode for an electric device according to the present invention.

In order to ensure a higher cycle property, x is preferably in the range from 29 to 44, y is preferably in the range from 14 to 48, and z is preferably in the range from 11 to 48. These numerical ranges correspond to the area indicated by sign C in FIG. 13.

Figure 14:
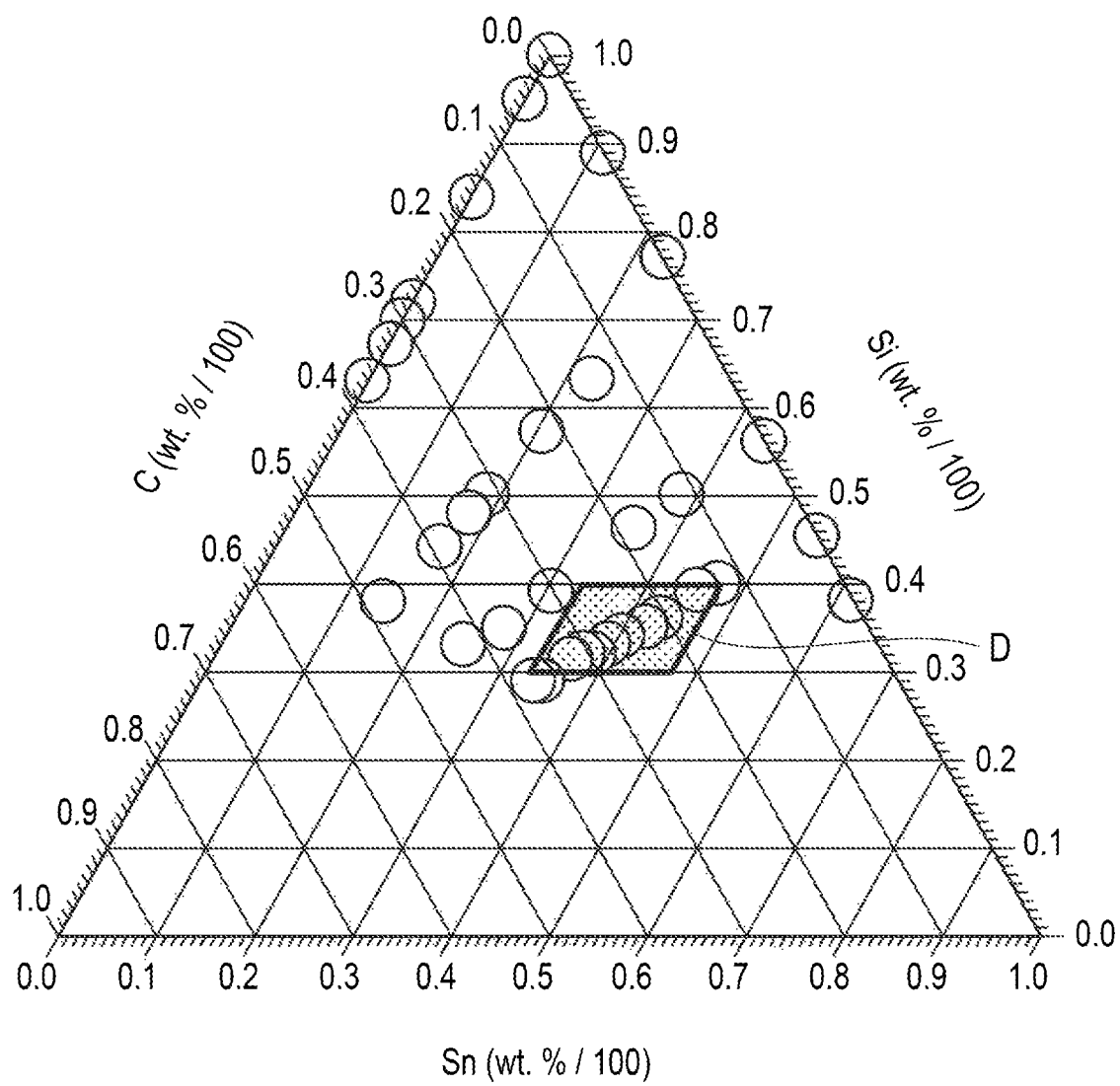
FIG. 14 is a ternary composition diagram showing still more preferable composition ranges of the Si—Sn—C series alloy contained in the negative electrode active material included in the negative electrode for an electric device according to the present invention.
Figure 15:
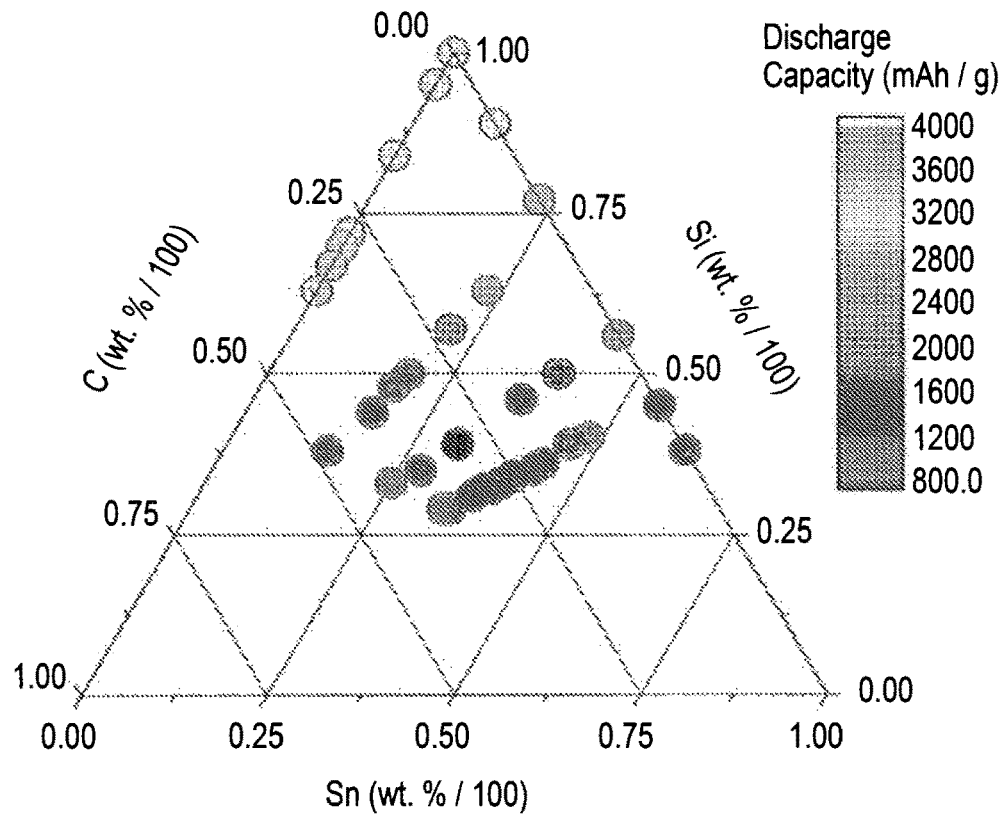
FIG. 15 is a diagram showing an influence of the alloy composition of the negative electrode active material on an initial discharge capacity of a battery obtained in each of reference examples and comparative reference examples.
Figure 16:
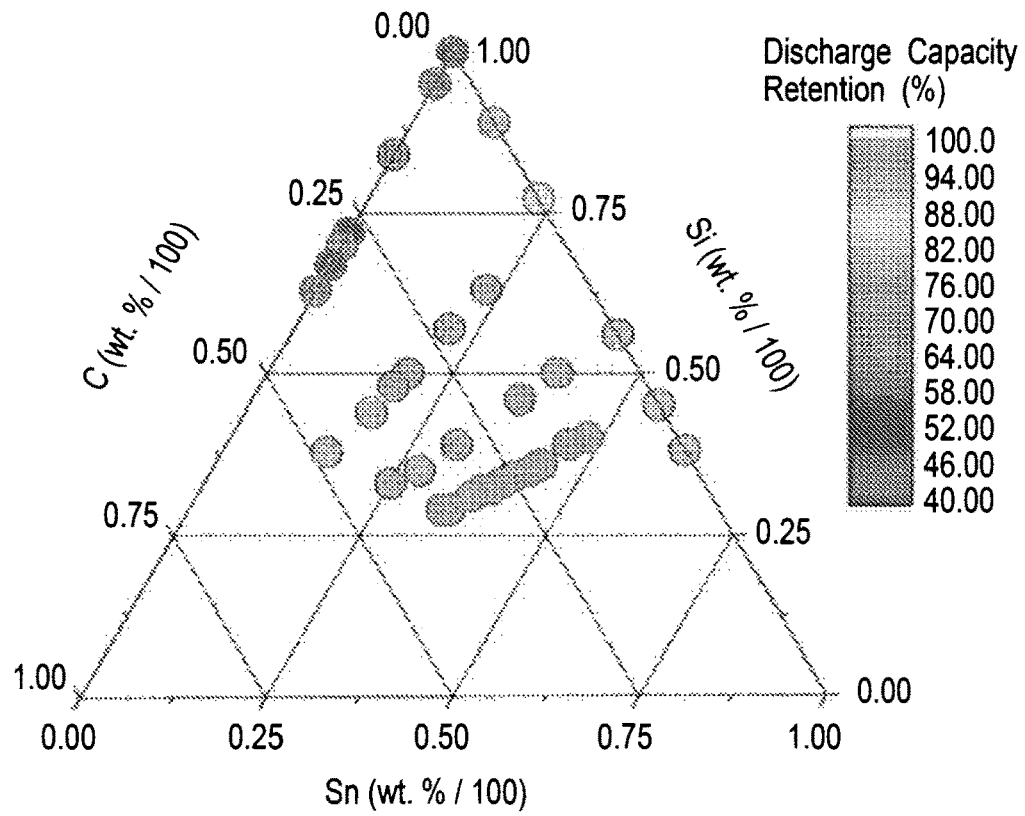
FIG. 16 is a diagram showing an influence of the alloy composition of the negative electrode active material on a discharge capacity retention rate at the 50th cycle in the battery obtained in each of the reference examples and comparative reference examples.
Figure 17:
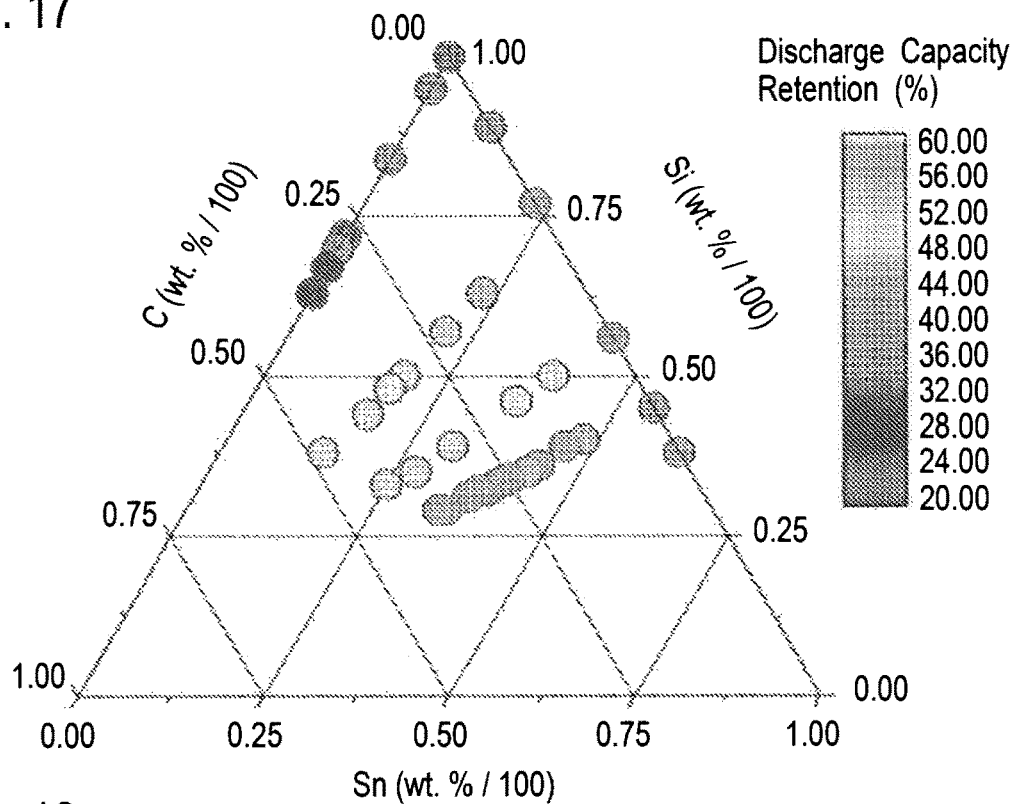
FIG. 17 is a diagram showing an influence of the alloy composition of the negative electrode active material on a discharge capacity retention rate at the 100th cycle in the battery obtained in each of the reference examples and comparative reference examples.

More preferably, x is in the range from 29 to 40, y is in the range from 34 to 48 (and z thus satisfies $12<z<37$). These numerical ranges correspond to the area indicated by sign D in FIG. 14.

Here, a satisfies $0 \le a < 0.5$, preferably $0 \le a < 0.1$.

(Average Particle Diameter of Si Alloy)

An average particle diameter of the Si alloy is not particularly limited as long as it is substantially identical to that of the negative electrode active material contained in the existing negative electrode active material layer 15. The average particle diameter may be preferably in the range from 1 μm to 20 μm in view of higher output power. However, the average particle diameter is not limited to this range and can, of course, deviate therefrom as long as the effects of the present embodiment can effectively be exhibited. The shape of the Si alloy is not particularly limited and may be a spherical shape, an elliptical shape, a cylindrical shape, a polygonal prism shape, a scale shape or an unfixed shape.

(Method for Producing Alloy)

A method for producing the alloy represented by the composition formula $Si_xSn_yM_zA_a$ according to the present embodiment is not particularly limited, and several kinds of known methods may be used for the production of the alloy. Namely, a variety of production methods may be used because there is little difference in the conditions and characteristics of the alloy produced by the production methods.

Examples of the method for producing the alloy in a particle state having the composition formula $Si_xSn_yM_zA_a$ include a mechanical alloying method and an arc plasma melting method.

According to the methods for producing the alloy in a particle state, a binder, a conductive auxiliary agent and a viscosity control solvent may be added to the particles to prepare slurry, so as to form a slurry electrode by use of the slurry thus obtained. These producing methods are superior in terms of mass production and practicality for actual battery electrodes.

<Negative Electrode Current Collector>

The positive electrode current collector 12 is made from an electrically conductive material. The size of the current collector may be determined depending on the intended use of the battery. For example, a current collector having a large area is used for a large-size battery for which high energy density is required.

The shape of the current collector is not particularly limited. The laminated battery 10 shown in FIG. 1 may use a current collecting foil or a mesh current collector (such as an expanded grid). According to the present embodiment, a current collecting foil is preferably used.

The material used for the current collector is not particularly limited. For example, a metal or resin in which electrically conductive filler is added to an electrically conductive polymer material or a non-conductive polymer material may be used.

Examples of the metal include copper, aluminum, nickel, iron, stainless steel, titanium, and an alloy thereof. In addition, a clad metal of nickel and aluminum, a clad metal of copper and aluminum, or an alloyed material of these metals combined together, may be used. A foil in which a metal surface is covered with aluminum may also be used. In particular, copper may be preferable as described in detail below in view of electron conductivity, battery action potential, and adhesion of the negative electrode active material to the current collector by sputtering.

Examples of the electrically conductive polymer material include polyaniline, polypyrrole, polythiophene, polyacetylene, polyparaphenylene, polyphenylene vinylene, polyacrylonitrile, and polyoxadiazole. These electrically conductive polymer materials have the advantage in simplification of the manufacturing process and lightness of the current collector, since these materials have sufficient electric conductivity even if electrically conductive filler is not added thereto.

Examples of the non-conductive polymer material include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). These non-conductive polymer materials have high potential resistance or solvent resistance.

The electrically conductive polymer material or the non-conductive polymer material may include electrically conductive filler that is added as necessary. In particular, when the resin serving as a substrate of the current collector only contains a non-conductive polymer, the electrically conductive filler is essential to impart electric conductivity to the resin.

The electrically conductive filler is not particularly limited as long as it is a substance having electric conductivity. Examples of the material having high electric conductivity, potential resistance or lithium ion insulation property, include metal and electrically conductive carbon. The metal is not particularly limited; however, the metal is preferably at least one element selected from the group consisting of Ni, Ti, Al, Cu, Pt, Fe, Cr, Sn, Zn, In, Sb, and K, or an alloy or metal oxide containing these metals. The electrically conductive carbon is not particularly limited; however, the electrically conductive carbon is preferably at least one material selected from the group consisting of acetylene black, Vulcan, Black Pearls, carbon nanofiber, Ketjenblack, carbon nanotube, carbon nanohorn, carbon nanoballoon, and fullerene.

The amount of the electrically conductive filler added in the current collector is not particularly limited as long as it imparts sufficient electric conductivity to the current collector. In general, the amount thereof is approximately in the range from 5 to 35% by mass.

The negative electrode according to the present embodiment is characterized in that elastic elongation of the current collector in a planar direction is 1.30% or higher. Here, the elastic elongation (%) of the current collector is a ratio (%) of magnitude of elastic elongation up to a proportional limit in an extension direction to an original size.

The negative electrode according to the present embodiment using the predetermined ternary Si alloy as a negative electrode active material can concurrently ensure an initial discharge capacity as high as a Si negative electrode and achieve the effects of suppressing amorphous-crystal phase transition so as to extend cycle life when Si is alloyed with Li.

However, when a battery is manufactured by use of a negative electrode obtained in a manner such that a negative electrode active material layer containing the predetermined ternary Si alloy described above together with a conductive auxiliary agent and a binder is applied to each surface of a negative electrode current collector, expansion-contraction of a negative electrode active material may occur in association with charge and discharge of the battery. The expansion-contraction leads to a volumetric change of the negative electrode active material layer so that stress acts on the current collector adhering to the negative electrode active material layer. If the current collector cannot follow the volumetric change of the negative electrode active material layer, plastic deformation is caused in the current collector so that the current collector is wrinkled. Wrinkles formed on the current collector cause distortion of the negative electrode active material layer so that an even distance between the negative electrode and the positive electrode cannot be kept. This may lead to a decrease in Li reactivity or cause electrode concentration. Further, the current collector may be cracked or broken because of the plastic deformation caused therein, or the negative electrode active material layer may be damaged directly by the plastic deformation, which results in a decrease in discharge capacity of the battery.

The negative electrode according to the present embodiment has been provided to solve the problems described above. The negative electrode having elastic elongation of 1.30% or higher enables the current collector to elastically follow a volumetric change of the negative electrode active material layer caused by expansion-contraction of the negative electrode active material due to charge and discharge. Thus, wrinkles caused in association with stress acting on the current collector adhering to the negative electrode active material layer can be prevented so as to suppress distortion of the negative electrode active material layer or breakage of the negative electrode active material layer or the current collector. As a result, the even distance between the negative electrode and the positive electrode can be kept. In addition, a side reaction hardly occurs and therefore, a high discharge capacity can be ensured. Further, since plastic deformation of the current collector is not easily caused even when the battery is charged and discharged repeatedly, the cycle durability can also be improved.

In addition, a decrease in capacity and cycle durability can be minimized when the current collector has the elastic elongation of 1.30% or higher, since the current collector adhering to the negative electrode active material layer can be elastically deformed even if elasticity of the negative electrode active material layer is lost because of expansion-contraction of the negative electrode active material in association with charge and discharge.

The elastic elongation of the current collector used in the negative electrode according to the present embodiment is preferably 1.40% or higher. The current collector with the elastic elongation of 1.40% or higher can more easily follow the volumetric change in the negative electrode active material used in the present embodiment caused in association with charge and discharge. Accordingly, an improvement rate of the discharge capacity retention rate greatly increases so as to further improve the cycle property. Further, the current collector with the elastic elongation of 1.50% or higher can ensure further improved effects when used together with the negative electrode active material according to the present embodiment.

The upper limit of the elastic elongation is not particularly limited because the current collector can elastically follow the volumetric change of the negative electrode active material layer more easily as the elastic elongation of the current collector is higher.

Although the negative electrode active material used in the present embodiment has a large volumetric change in association with charge and discharge compared with a carbon material such as graphite, the use of the current collector described above can suppress plastic deformation thereof, and suppress distortion of the negative electrode active material layer and a decrease of the discharge capacity derived from the distortion. In contrast, when pure Si is used for the negative electrode active material, the volumetric change in association with charge and discharge increases and therefore, even the current collector described above cannot sufficiently follow such a volumetric change of the negative electrode active material layer. As a result, it may be difficult to prevent a decrease in discharge capacity. On the other hand, when using the ternary Si alloy active material according to the present embodiment, the current collector is only required to have 1.30% or higher of the elastic elongation and contributes to providing the battery having a high discharge capacity and cycle property (refer to FIG. 18).

Note that, in the present specification, the elastic elongation (%) of the current collector is measured in accordance with a tension test method prescribed in JIS K 6251 (2010). In addition, the elastic elongation (%) of the current collector represents a value measured at 25° C.

The current collector according to the present embodiment preferably has tensile strength of 150 N/mm$^2$ or higher. When the tensile strength is 150 N/mm$^2$ or higher, the effect of preventing breakage of the current collector is improved.

Note that, in the present specification, the tensile strength (N/mm$^2$) of the current collector is measured in accordance with the tension test method prescribed in JIS K 6251 (2010). In addition, the tensile strength (N/mm$^2$) of the current collector represents a value measured at 25° C.

As described above, the material composing the current collector according to the present embodiment is not particularly limited as long as 1.30% or higher of the elastic elongation of the current collector is obtained. However, a metal such as copper, aluminum, nickel, iron, stainless steel, titanium or cobalt, or an alloy of these metals may be preferably used for the current collector.

With regard to the metals listed above, a metal foil using copper, nickel, stainless steel, or an alloy in which another metal is added to these metals is preferable in view of mechanical strength, adhesion to the active material layer, chemical stability, electrochemical stability in potential where a battery reaction progresses, electrical conductivity, and costs. Among them, copper or a copper alloy is particularly preferable in view of standard oxidation reduction potential.

As for the copper foil, a rolled copper foil (a copper foil obtained by a rolling method) or an electrolytic copper foil (a copper foil obtained by an electrolytic method) may be used. As for the copper alloy foil, an electrolytic copper alloy foil or a rolled copper alloy foil may be used. Since the negative electrode according to the present embodiment has high tensile strength and bending performance, the rolled copper foil or the rolled copper alloy foil is preferably used.

As for the copper alloy, an alloy in which an element such as Zr, Cr, Zn or Sn is added to copper may be preferably used. Such an alloy has a high elastic modulus, easily follows the volumetric change of the negative electrode active material layer, and hardly causes plastic deformation, as compared with pure copper, so as not easily cause wrinkles or breakage on the current collector. In addition, the alloy in which the element such as Zr, Cr, Zn or Sn is added to copper can have higher heat resistance than pure copper. In particular, an alloy having a softening point which is higher than a heat treatment temperature (approximately 300° C.) at which slurry containing a negative electrode active material applied to a current collector is dried in a process of manufacturing a negative electrode, is preferable since the elasticity thereof can be maintained even after the heat treatment. Among them, the alloy to which Cr, Zn or Sn is added is particularly preferable in view of elastic retention after heat treatment. Each of these alloy elements may be used singly, or two or more thereof may be contained together. The total content of these alloy elements is, for example, in the range from 0.01 to 0.9% by mass, preferably in the range from 0.03 to 0.9% by mass, more preferably in the range from 0.3 to 0.9% by mass. The content of the alloy elements that is 0.03% by mass or greater is favorable in view of elastic retention after heat treatment.

A method of obtaining the current collector having 1.30% or higher of the elastic elongation is not particularly limited. When the current collector according to the present embodiment is formed of a metal foil, the mechanical characteristics can vary by heating, cooling applying pressure, or adding an impurity element. Alternatively, a commercially-available metal foil having the elongation described above may be used.

The thickness of the current collector of the negative electrode is not particularly limited; however, the thickness is preferably in the range from 5 μm to 15 μm, more preferably in the range from 5 μm to 10 μm in the case of the negative electrode according to the present embodiment. The thickness of the current collector of the negative electrode that is 5 μm or greater is preferable because sufficient mechanical strength can be ensured. In addition, the thickness of the current collector of the negative electrode that is 15 μm or less is preferable in view of a decrease in thickness of the battery.

A current collector for a bipolar electrode may be the same as the negative electrode current collector. In particular, a current collector having resistance to both positive electrode potential and negative electrode potential is preferably used.

(Elements Common to Positive Electrode and Negative Electrode)

Hereinafter, elements common to both the positive electrode and the negative electrode will be explained.

The positive electrode active material layer 13 and the negative electrode active material layer 15 each contain, for example, a binder, a conductive auxiliary agent, electrolyte salt (lithium salt), and an ion-conducting polymer.

Binder

The binder used in the respective active material layers is not particularly limited. Examples of the binder include: a thermoplastic polymer such as polyethylene, polypropylene, polyethylene terephthalate (PET), polyethernitrile (PEN), polyacrylonitrile, polyimide, polyamide, polyamide imide, cellulose, carboxymethylcellulose (CMC), an ethylene-vinyl acetate copolymer, polyvinyl chloride, styrene butadiene rubber (SBR), isoprene rubber, butadiene rubber, ethylene propylene rubber, an ethylene propylene diene copolymer, a styrene-butadiene-styrene block copolymer and a hydrogen additive thereof, and a styrene-isoprene-styrene block copolymer and a hydrogen additive thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDIF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber); and epoxy resin. Among these, polyvinylidene fluoride, polyimide, styrene-butadiene rubber, carboxymethyl cellulose, polypropylene, polytetrafluoroethylene, polyacrylonitrile, polyamide, and polyamide imide are particularly preferable. These binders are suitable for use in the respective active material layers since these binders have high heat resistance, have quite a wide potential window, and are stable with respect to both positive electrode potential and negative electrode potential. These binders may be used alone or in combination of two or more.

The amount of the binder contained in the respective active material layers is not particularly limited as long as it is sufficient to bind the active material. However, the amount of the binder is preferably in the range from 0.5 to 15% by mass, more preferably in the range from 1 to 10% by mass.

Conductive Auxiliary Agent

The conductive auxiliary agent is an additive added in order to improve electric conductivity in the positive electrode active material layer or the negative electrode active material layer. The conductive auxiliary agent may be a carbon material such as carbon black (such as acetylene black), graphite, and vapor-grown carbon fiber. The addition of the conductive auxiliary agent in the active material layers contributes to effectively establishing an electronic network in the active material layers and improving the output performance of the battery.

The conductive auxiliary agent and the binder may be replaced with an electrically conductive binder having both functions of the conductive auxiliary agent and the binder. Alternatively, the electrically conductive binder may be used together with one of or both the conductive auxiliary agent and the binder. The electrically conductive binder may be a commercially available binder such as TAB-2 manufactured by Hohsen Corp.

The content of the conductive auxiliary agent in the respective active material layers, with respect to the total amount of each active material layer, is 10/% by mass or greater, preferably 3% by mass or greater, more preferably 5% by mass or greater. Also, the content of the conductive auxiliary agent in the respective active material layers, with respect to the total amount of each active material layer, is 15% by mass or less, preferably 10% by mass or less, more preferably 7% by mass or less. The mixing ratio (the content) of the conductive auxiliary agent contained in the positive electrode active material layer, which has low electronic conductivity of the active material per se and can reduce electrode resistance depending on the amount of the conductive auxiliary agent, is regulated within the range described above so as to achieve the following effects. The conductive auxiliary agent having the content within the range described above can secure sufficient electronic conductivity without impairing an electrode reaction, prevent a decrease in energy density due to a decrease in electrode density, and even increase the energy density in association with an increase of the electrode density.

Electrolyte Salt (Lithium Salt)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Ion-Conducting Polymer

Examples of the ion-conducting polymer include a polyethylene oxide (PEO)-based polymer and a polypropylene oxide (PPO)-based polymer.

A mixing ratio of the components contained in each of the positive electrode active material layer and the negative electrode active material layer using the alloy in a particle state is not particularly limited. The mixing ratio may be adjusted by appropriately referring to the known findings on non-aqueous secondary batteries.

The thickness of each active material layer (the active material layer provided on one surface of each current collector) is not particularly limited, and the known findings on batteries may be appropriately referred to. As an example, the thickness of the respective active material layers is generally approximately in the range from 1 μm to 500 μm, preferably in the range from 2 μm to 100 μm, in view of the intended use of the battery (for example, priority on output, priority on energy) and ion conductivity.

<Electrolyte Layer>

A liquid electrolyte or a polymer electrolyte may be used for an electrolyte contained in the electrolyte layer 17.

The liquid electrolyte has a constitution in which electrolyte salt (lithium salt) is dissolved in an organic solvent. The organic solvent may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), or methyl propyl carbonate (MPC).

The lithium salt may be a compound that can be added to the active material layers in the respective electrodes, such as $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$.

The polymer electrolyte is divided into two types; a gel electrolyte containing an electrolysis solution and an intrinsic polymer electrolyte not containing an electrolysis solution.

The gel electrolyte has a constitution in which the liquid electrolyte (electrolysis solution) is injected into a matrix polymer containing an ion-conducting polymer. The use of the gel polymer electrolyte has the advantage of decreasing fluidity of the electrolyte so as to easily interrupt ion conduction between the respective layers.

Examples of the ion-conducting polymer used for the matrix polymer include polyethylene oxide (PEO), polypropylene oxide (PPO), and a copolymer thereof. In such a polyalkylene oxide polymer, electrolyte salt such as lithium salt can be dissolved sufficiently.

The content ratio of the liquid electrolyte (the electrolysis solution) in the gel electrolyte should not be particularly limited, but is preferably in the range from several % by mass to 98% by mass in view of ion conductivity or the like. According to the present embodiment, the gel electrolyte exhibits better effects particularly when containing a large amount of the electrolysis solution of which the content ratio is 70% by mass or greater.

Here, a separator may be used in the respective electrolyte layers when the electrolyte layers contain the liquid electrolyte, the gel electrolyte or the intrinsic polymer electrolyte. Examples of the specific configuration of the separator (including nonwoven fabric) include a microporous film or a porous flat plate made from polyolefin such as polyethylene and polypropylene, and a nonwoven fabric.

The intrinsic polymer electrolyte has a constitution in which supporting salt (lithium salt) is dissolved in the matrix polymer, but no organic solvent serving as a plasticizer is contained therein. Thus, the use of the intrinsic polymer electrolyte contributes to reducing the risk of liquid leakage from the battery and thereby enhancing the reliability of the battery.

The matrix polymer of the gel electrolyte or the intrinsic polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization, such as thermal polymerization, ultraviolet polymerization, radiation polymerization, or electron beam polymerization, by use of an appropriate polymerization initiator.

<Current Collecting Plate and Lead>

Current collecting plates may be used to extract a current outward from the battery. Such current collecting plates are electrically connected to the current collectors or leads and exposed to the outside of the laminated sheet as a battery exterior member.

The material constituting the current collecting plates is not particularly limited and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof, more preferably aluminum or copper in view of lightness, corrosion resistance and high electric conductivity. The positive electrode current collecting plate and the negative electrode current collecting plate may be made from the same material or may be made from different materials.

A positive terminal lead and a negative terminal lead are used as necessary. The positive terminal lead and the negative terminal lead may be terminal leads conventionally used for lithium ion secondary batteries. Each part exposed to the outside of the battery exterior member 29 is preferably covered with, for example, a heat shrinkable tube having a heat resistant insulating property so as not to exert influence on surrounding products (such as components in the vehicle, in particular, electronic devices) due to a short circuit because of contact with peripheral devices or wires.

<Battery Exterior Member>

As the battery exterior member 29, a known metal can casing may be used. Alternatively, a sac-like casing capable of covering the power generation element and formed of a laminated film containing aluminum may be used. The laminated film may be a film having a three-layer structure in which PP, aluminum and nylon are laminated in this order, but is not particularly limited thereto. The laminated film is preferable in view of higher output power and cooling performance, and suitability for use in batteries used for large devices such as EV and HEV.

The lithium ion secondary battery described above may be manufactured by a conventionally-known method.

<Appearance of Lithium Ion Secondary Battery>

Figure 2:
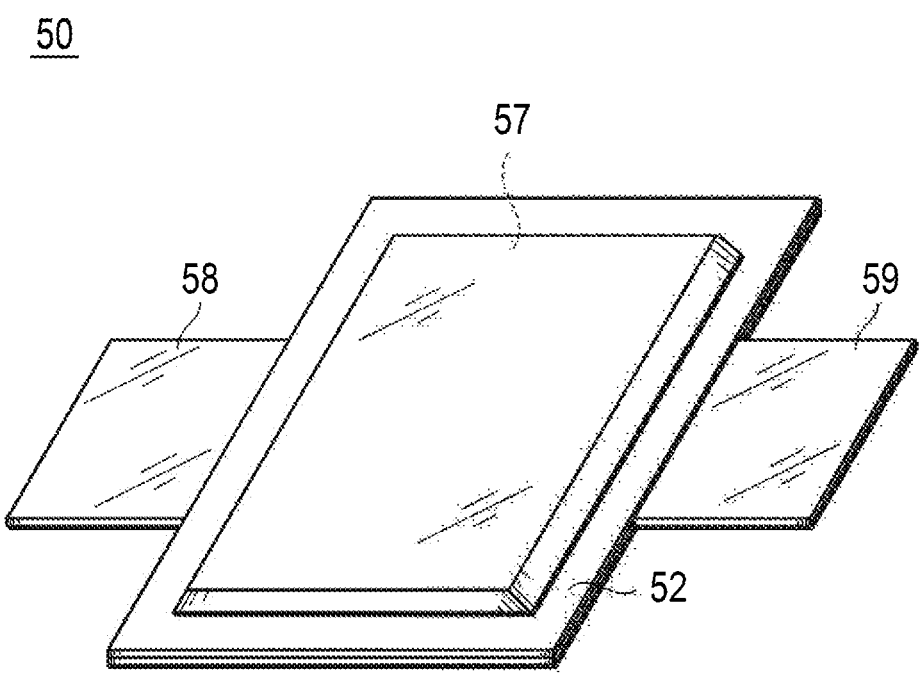
FIG. 2 is a perspective view schematically showing an appearance of the laminated-type flat lithium ion secondary battery which is the typical embodiment of the electric device according to the present invention.

FIG. 2 is a perspective view showing an appearance of a laminated flat lithium ion secondary battery.

As shown in FIG. 2, a laminated flat lithium ion secondary battery 50 has a flat rectangular shape, and a positive electrode current collecting plate 58 and a negative electrode current collecting plate 59 for extracting electricity are exposed to the outside of the battery on both sides. A power generation element 57 is enclosed by a battery exterior member 52 of the lithium ion secondary battery 50, and the periphery thereof is thermally fused. The power generation element 57 is tightly sealed in a state where the positive electrode current collecting plate 58 and the negative electrode current collecting plate 59 are exposed to the outside of the battery. The power generation element 57 corresponds to the power generation element 21 of the lithium ion secondary battery (the laminated battery) 10 shown in FIG. 1. The power generation element 57 is obtained in a manner such that the plural single cell layers (single cells) 19 are stacked on top of each other, each single cell layer 19 being formed of the positive electrode (positive electrode active material layer 13), the electrolyte layer 17 and the negative electrode (negative electrode active material layer 15).

The lithium ion secondary battery is not limited to the laminated flat battery (laminated cell). A wound lithium ion battery may include, without particular limitation, a battery having a cylindrical shape (coin cell), a prismatic shape (prismatic cell) or a rectangular flat shape obtained by deforming the cylindrical shape, and a cylinder-like cell. A laminated film or a conventional cylinder can (metal can) may be used as an exterior material for the cylindrical shape battery or the prismatic shape battery without particular limitation. Preferably, a power generation element of each battery is enclosed by an aluminum laminated film. Such a configuration can contribute to a reduction in weight.

The exposed state of the positive electrode current collecting plate 58 and the negative electrode current collecting plate 59 shown in FIG. 2 is not particularly limited. The positive electrode current collecting plate 58 and the negative electrode current collecting plate 59 may protrude from the same side. Alternatively, the positive electrode current collecting plate 58 and the negative electrode current collecting plate 59 may each be divided into some pieces to protrude separately from each side. Thus, the current collecting plates are not limited to the configuration shown in FIG. 2. In the wound lithium ion battery, a terminal may be formed by use of, for example, a cylinder can (metal can) in place of the current collecting plate.

As described above, the negative electrode and the lithium ion secondary battery using the negative electrode active material for a lithium ion secondary battery according to the present embodiment can suitably be used as a large-capacity power source for an electric vehicle, a hybrid electric vehicle, a fuel cell vehicle, or a hybrid fuel cell vehicle. Thus, the negative electrode and the lithium ion secondary battery can suitably be applied to a power source for driving a vehicle and an auxiliary power source that are required to have high volumetric energy density and high volumetric output density.

The lithium ion battery was exemplified above as the electric device in the present embodiment. However, the present embodiment is not limited to this and may be applicable to secondary batteries of different types and, further, to primary batteries. In addition, the present embodiment may be applicable not only to batteries but also to capacitors.

EXAMPLES

Hereinafter, the present invention will be explained in more detail with reference to examples; however, the scope of the present invention is not limited only to the following examples.

First, as reference examples, each Si alloy represented by the chemical formula (1) contained in the negative electrode for an electric device according to the present invention was subjected to performance evaluation.

Reference Example A

Performance Evaluation of $Si_xSn_yAl_zA_a$

[1] Production of Negative Electrode

As a sputtering apparatus, an independently controllable ternary DC magnetron sputtering apparatus (manufactured by Yamato-Kiki Industrial Co., Ltd.; combinatorial sputter coating apparatus; gun-sample distance: approximately 100 mm) was used. Thin films of negative electrode active material alloys having various compositions were each formed on a substrate (a current collector) made of a nickel foil having a thickness of 20 µm under the following conditions, so as to obtain 23 negative electrode samples (Reference Examples 1 to 14 and Comparative Reference Examples 1 to 9).

(1) Targets (manufactured by Kojundo Chemical Laboratory Co., Ltd.; purity: 4N)

Si: diameter of 50.8 mm; thickness of 3 mm (with a backing plate made of oxygen-free copper having a thickness of 2 mm)

Sn: diameter of 50.8 mm; thickness of 5 mm

Al: diameter of 50.8 mm; thickness of 3 mm (2) Conditions of Film Formation

Base pressure: up to $7 \times 10^{-6}$ Pa

Sputtering gas: Ar (99.9999% or higher)

Sputtering gas introduction amount: 10 sccm

Sputtering pressure: 30 mTorr

DC power source: Si (185 W), Sn (0 to 40 W), Al (0 to 150 W)

Pre-sputtering time: 1 min.

Sputtering time: 10 min.

Substrate temperature: room temperature (25° C.)

In particular, the negative electrode samples including the thin alloy films having various compositions were obtained in such a manner as to use the Si target, the Sn target and the Al target described above, fix the sputtering time for 10 minutes, change the power levels of the DC power source for each target within the above-described ranges, and form the thin alloy films in an amorphous state on the Ni substrates.

As for the sample preparation, for example, in Reference Example 4, the DC power source 1 (Si target) was set to 185 W, the DC power source 2 (Sn target) was set to 25 W, and the DC power source 3 (Al target) was set to 130 W. In Comparative Reference Example 2, the DC power source 1 (Si target) was set to 185 W, the DC power source 2 (Sn target) was set to 30 W, and the DC power source 3 (Al target) was set to 0 W. In Comparative Reference Example 5, the DC power source 1 (Si target) was set to 185 W, the DC power source 2 (Sn target) was set to 0 W, and the DC power source 3 (Al target) was set to 78 W.

Table 1 and FIG. 3 to FIG. 6 show the respective component compositions of the thin alloy films thus obtained. The obtained thin alloy films were analyzed by using the following analysis method and analysis device.

(3) Analysis Method

Composition analysis: SEM-EDX analysis (manufactured by JEOL Ltd.), EPMA analysis (manufactured by JEOL Ltd.)

Film thickness measurement (for calculating sputtering rate): film thickness meter (manufactured by Tokyo Instruments, Inc.)

Film state analysis: Raman spectroscopic analysis (manufactured by Bruker Corporation)

[2] Production of Battery

Each of the negative electrode samples obtained as described above was placed to face the counter electrode made of a lithium foil (manufactured by Honjo Metal Co., Ltd.; diameter 15 mm; thickness: 200 μm) via a separator (Celgard 2400 manufactured by Celgard, LLC.), and an electrolysis solution was injected therein so as to prepare a CR2032 type coin cell for each example.

The electrolysis solution used was prepared in a manner such that $LiPF_6$ (lithium hexafluorophosphate) was dissolved, at a concentration of 1 M, into a mixed non-aqueous solvent in which ethylene carbonate (EC) and diethyl carbonate (DEC) were mixed in a volume ratio of 1:1.

[3] Charge-discharge Test of Battery

The following charge-discharge test was performed on the respective batteries obtained as described above.

The respective batteries were charged and discharged by use of a charge-discharge tester (HJ0501SM8A manufactured by Hokuto Denko Corporation) in a thermostat bath (PFU-3K manufactured by ESPEC Corp.) set at 300 K (27° C.). In particular, each battery was charged at 0.1 mA from 2 V to 10 mV in a constant-current/constant-voltage mode during charging (in the process of Li intercalation to the negative electrode as an evaluation target). Subsequently, each cell was discharged at 0.1 mA from 10 mV to 2 V in a constant-current mode during discharging (in the process of Li release from the negative electrode). This procedure, which is regarded as a single charge-discharge cycle, was repeated 100 times.

Thereafter, a discharge capacity at each of the 50th cycle and the 100th cycle was obtained, and a retention rate at each of the 50th cycle and the 100th cycle with respect to the discharge capacity at the 1st cycle was calculated. Table 1 shows the results thus obtained. The discharge capacity was calculated per alloy weight. Note that, in Table 1, "discharge capacity (mAh/g)" represents a value per pure Si or alloy weight and represents a capacity when Li reacts to the Si—Sn-M alloy (Si—Sn alloy, pure Si or Si—Sn alloy). Here, "the initial capacity" described in the present specification corresponds to "the discharge capacity (mAh/g)" of the initial cycle (at the 1st cycle).

In addition, "the discharge capacity retention rate (%)" at each of the 50th cycle and the 100th cycle represents an index for "how much of the initial capacity is maintained." The discharge capacity retention rate (%) was calculated according to the following formula.

Discharge capacity retention rate (%)=(discharge capacity at 50th cycle or 100th cycle)/(discharge capacity at 1st cycle)×100 [Math. 1]

TABLE 1

|  | Composition | | | 1st Cycle Discharge Capacity | 50th Cycle Discharge Capacity Retention Rate | 100th Cycle Discharge Capacity Retention Rate |
| --- | --- | --- | --- | --- | --- | --- |
|  | Si (%) | Sn (%) | Al (%) | (mAh/g) | (%) | (%) |
| Reference Example 1 | 50 | 19 | 31 | 1753 | 92 | 55 |
| Reference Example 2 | 45 | 17 | 38 | 1743 | 93 | 57 |
| Reference Example 3 | 42 | 16 | 42 | 1720 | 95 | 58 |
| Reference Example 4 | 41 | 16 | 43 | 1707 | 95 | 61 |
| Reference Example 5 | 44 | 35 | 21 | 2077 | 95 | 55 |
| Reference Example 6 | 42 | 33 | 25 | 1957 | 93 | 55 |
| Reference Example 7 | 38 | 29 | 33 | 1949 | 93 | 55 |
| Reference Example 8 | 37 | 29 | 34 | 1939 | 93 | 56 |
| Reference Example 9 | 36 | 28 | 36 | 1994 | 94 | 60 |
| Reference Example 10 | 37 | 45 | 18 | 2004 | 96 | 56 |
| Reference Example 11 | 35 | 41 | 24 | 1996 | 95 | 55 |
| Reference Example 12 | 34 | 41 | 25 | 1985 | 95 | 56 |
| Reference Example 13 | 33 | 40 | 27 | 1893 | 96 | 56 |
| Reference Example 14 | 31 | 38 | 31 | 1880 | 96 | 62 |
| Comparative Reference Example 1 | 100 | 0 | 0 | 3232 | 47 | 22 |
| Comparative Reference Example 2 | 56 | 44 | 0 | 1817 | 91 | 42 |
| Comparative Reference Example 3 | 45 | 55 | 0 | 1492 | 91 | 42 |
| Comparative Reference Example 4 | 38 | 62 | 0 | 1325 | 91 | 42 |

TABLE 1-continued

|  | Composition | | | 1st Cycle Discharge Capacity | 50th Cycle Discharge Capacity Retention Rate | 100th Cycle Discharge Capacity Retention Rate |
| --- | --- | --- | --- | --- | --- | --- |
|  | Si (%) | Sn (%) | Al (%) | (mAh/g) | (%) | (%) |
| Comparative Reference Example 5 | 61 | 0 | 39 | 1747 | 41 | 39 |
| Comparative Reference Example 6 | 72 | 0 | 28 | 2119 | 45 | 38 |
| Comparative Reference Example 7 | 78 | 0 | 22 | 2471 | 45 | 27 |
| Comparative Reference Example 8 | 87 | 0 | 13 | 2805 | 44 | 17 |
| Comparative Reference Example 9 | 97 | 0 | 3 | 3031 | 47 | 17 |

The tests revealed according to Table 1 that the batteries of Reference Examples 1 to 14 each showed a good balance of the discharge capacity at the first cycle, the discharge capacity retention rate at the 50th cycle and the discharge capacity retention rate at the 100th cycle. In particular, the batteries were well-balanced when Si was 12% by mass or greater and less than 100% by mass, Sn was greater than 0% by mass and 45% by mass or less, and Al was greater than 0% by mass and 43% by mass or less. On the other hand, the batteries of Comparative Reference Examples 1 to 9 showed a considerable decrease of the discharge capacity retention rate even through the discharge capacity at the 1 st cycle was high.

In summary, the following results were confirmed with regard to the batteries of the respective reference examples each using the Si—Sn—Al alloy as a negative electrode active material including the compositions within the predetermined ranges according to the present invention. In particular, it was confirmed that these batteries each had a high initial capacity exceeding 1700 mAh/g, showed discharge capacity retention rates of 92% or higher at the 50th cycle and 55% or higher even at the 100th cycle, and exhibited a good balance of the capacity and the cycle durability. On the other hand, both the initial capacity and the cycle durability in each of the batteries of the comparative reference examples showed values lower than the values in the respective reference examples. Especially, it was confirmed that the nearly pure Si alloy tended to have a high capacity but have a poor cycle property. In addition, it was confirmed that the alloy having a high Sn content tended to have a relatively high cycle property but have a poor initial capacity.

Reference Example B

Performance Evaluation of $Si_xSn_yV_zA_a$

[1] Production of Negative Electrode

The same production procedure in Reference Example A was repeated so as to obtain 32 negative electrode samples (Reference Examples 15 to 27 and Comparative Reference Examples 10 to 28) except that "Al: diameter of 50.8 mm; thickness of 3 mm" of the target in item (1) of Reference Example A was changed to "V: diameter of 50.8 mm; thickness of 3 mm", and "Sn (0 to 40 W), Al (0 to 150 W)" of the DC power source in item (2) of Reference Example A was changed to "Sn (0 to 50 W), V (0 to 150 W)".

As for the sample preparation in item (2), for example, in Reference Example 25, the DC power source 1 (Si target) was set to 185 W, the DC power source 2 (Sn target) was set to 30 W, and the DC power source 3 (V target) was set to 140 W. In Comparative Reference Example 19, the DC power source 1 (Si target) was set to 185 W, the DC power source 2 (Sn target) was set to 30 W, and the DC power source 3 (V target) was set to 0 W. In Comparative Reference Example 25, the DC power source 1 (Si target) was set to 185 W, the DC power source 2 (Sn target) was set to 0 W, and the DC power source 3 (V target) was set to 80 W.

Table 2 and FIG. 7 to FIG. 10 show the respective component compositions of the thin alloy films thus obtained.

[2] Production of Battery

A CR2032 type coin cell was prepared for each example in the same manner as Reference Example A.

[3] Charge-discharge Test of Battery

The charge-discharge test was performed on the respective batteries in the same manner as Reference Example A. Table 2 shows the results thus obtained.

TABLE 2

|  | Composition | | | 1st Cycle Discharge Capacity | 50th Cycle Discharge Capacity Retention Rate | 100th Cycle Discharge Capacity Retention Rate |
| --- | --- | --- | --- | --- | --- | --- |
|  | Si (%) | Sn (%) | V (%) | (mAh/g) | (%) | (%) |
| Reference Example 15 | 43 | 34 | 23 | 1532 | 93 | 47 |
| Reference Example 16 | 37 | 29 | 32 | 1316 | 92 | 45 |
| Reference Example 17 | 33 | 26 | 41 | 1087 | 92 | 49 |
| Reference Example 18 | 27 | 21 | 52 | 832 | 92 | 46 |
| Reference Example 19 | 32 | 39 | 29 | 1123 | 92 | 47 |
| Reference Example 20 | 29 | 35 | 36 | 1023 | 93 | 48 |
| Reference Example 21 | 52 | 20 | 28 | 1682 | 92 | 45 |
| Reference Example 22 | 44 | 17 | 39 | 1356 | 92 | 47 |
| Reference Example 23 | 38 | 14 | 48 | 1103 | 93 | 48 |
| Reference Example 24 | 34 | 13 | 53 | 931 | 93 | 50 |

TABLE 2-continued

|  | Composition | | | 1st Cycle Discharge Capacity (mAh/g) | 50th Cycle Discharge Capacity Retention Rate (%) | 100th Cycle Discharge Capacity Retention Rate (%) |
| --- | --- | --- | --- | --- | --- | --- |
|  | Si (%) | Sn (%) | V (%) | | | |
| Reference Example 25 | 30 | 11 | 59 | 821 | 94 | 51 |
| Reference Example 26 | 27 | 10 | 63 | 712 | 92 | 44 |
| Reference Example 27 | 31 | 63 | 6 | 1135 | 92 | 46 |
| Comparative Reference Example 10 | 25 | 19 | 56 | 749 | 89 | 36 |
| Comparative Reference Example 11 | 24 | 29 | 47 | 795 | 90 | 38 |
| Comparative Reference Example 12 | 22 | 27 | 51 | 680 | 86 | 28 |
| Comparative Reference Example 13 | 25 | 52 | 23 | 872 | 88 | 34 |
| Comparative Reference Example 14 | 23 | 48 | 29 | 809 | 88 | 33 |
| Comparative Reference Example 15 | 22 | 44 | 34 | 733 | 86 | 28 |
| Comparative Reference Example 16 | 20 | 41 | 39 | 685 | 78 | 18 |
| Comparative Reference Example 17 | 19 | 38 | 43 | 563 | 73 | 11 |
| Comparative Reference Example 18 | 100 | 0 | 0 | 3232 | 47 | 22 |
| Comparative Reference Example 19 | 56 | 44 | 0 | 1817 | 91 | 42 |
| Comparative Reference Example 20 | 45 | 55 | 0 | 1492 | 91 | 42 |
| Comparative Reference Example 21 | 38 | 62 | 0 | 1325 | 91 | 42 |
| Comparative Reference Example 22 | 65 | 0 | 35 | 1451 | 85 | 40 |
| Comparative Reference Example 23 | 53 | 0 | 47 | 1182 | 85 | 42 |
| Comparative Reference Example 24 | 45 | 0 | 55 | 986 | 83 | 39 |
| Comparative Reference Example 25 | 34 | 0 | 66 | 645 | 90 | 44 |
| Comparative Reference Example 26 | 30 | 0 | 70 | 564 | 88 | 44 |
| Comparative Reference Example 27 | 27 | 0 | 73 | 495 | 86 | 36 |
| Comparative Reference Example 28 | 25 | 0 | 75 | 366 | 86 | 39 |

The tests revealed according to Table 2 that the batteries of the reference examples each showed a good balance of the discharge capacity at the first cycle, the discharge capacity retention rate at the 50th cycle and the discharge capacity retention rate at the 100th cycle. In particular, the good balance was achieved when Si was 27% by mass or greater and less than 100% by mass, Sn was greater than 0% by mass and 73% by mass or less, and V was greater than 0% by mass and 73% by mass or less. On the other hand, the batteries of the comparative reference examples showed a considerable decrease of the discharge capacity retention rate even through the discharge capacity at the 1st cycle was high.

In summary, the following results were confirmed with regard to the batteries of the reference examples. In particular, it was confirmed that the batteries each had a high initial capacity of 712 mAh/g or greater, and showed discharge capacity retention rates of 92% or higher after 50 cycles and 44% or higher after 100 cycles.

Reference Example C

Performance Evaluation of $Si_xSn_yC_zA_a$

[1] Production of Negative Electrode

The same production procedure in Reference Example A was repeated so as to obtain 34 negative electrode samples (Reference Examples 28 to 49 and Comparative Reference Examples 29 to 40) except that "Al: diameter of 50.8 mm; thickness of 3 mm" of the target in item (1) of Reference Example A was changed to "C: diameter of 50.8 mm; thickness of 3 mm (with a backing plate made of oxygen-free copper having a thickness of 2 mm), and "Al (0 to 150 W)" of the DC power source in item (2) of Reference Example A was changed to "C (0 to 150 W)".

As for the sample preparation in item (2), for example, in Reference Example 43, the DC power source 1 (Si target) was set to 185 W, the DC power source 2 (Sn target) was set to 35 W, and the DC power source 3 (C target) was set to 110 W. In Comparative Reference Example 30, the DC power source 1 (Si target) was set to 185 W, the DC power source 2 (Sn target) was set to 22 W, and the DC power source 3 (C target) was set to 0 W. In Comparative Reference Example 35, the DC power source 1 (Si target) was set to 185 W, the DC power source 2 (Sn target) was set to 0 W, and the DC power source 3 (C target) was set to 30 W.

Figure 11:
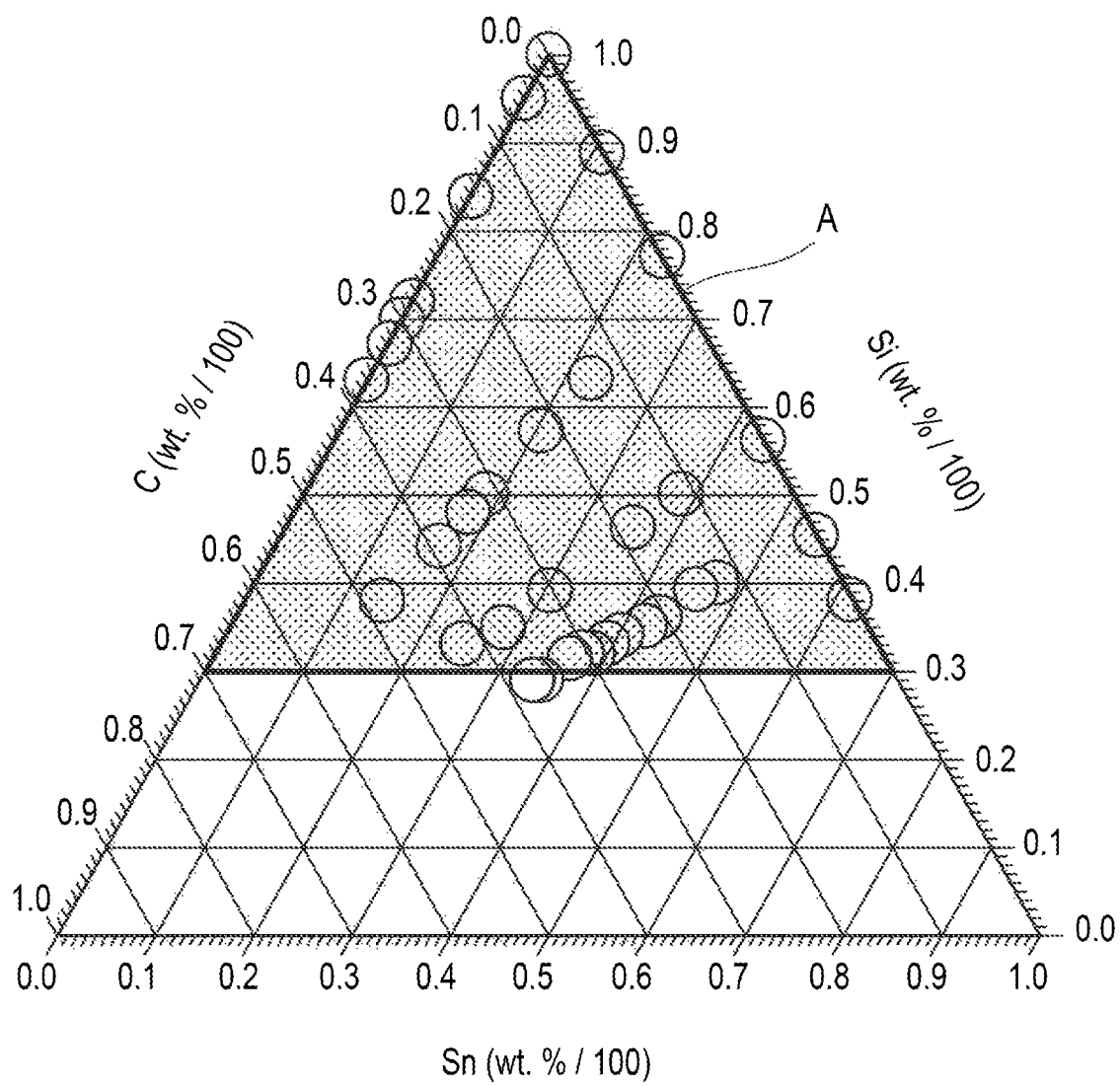
FIG. 11 is a ternary composition diagram showing composition ranges of a Si—Sn—C series alloy contained in the negative electrode active material included in the negative electrode for an electric device according to the present invention, wherein alloy compositions obtained in Reference Example C are plotted.

Table 3 and FIG. 11 show the respective component compositions of the thin alloy films thus obtained.

[2] Production of Battery

A CR2032 type coin cell was prepared for each example in the same manner as Reference Example A.

[3] Charge-discharge Test of Battery

The charge-discharge test was performed on the respective batteries in the same manner as Reference Example A. Table 3 shows the results thus obtained.

Next, a negative electrode for an electric device including a negative electrode active material layer containing a negative electrode active material using $Si_{41}Sn_{16}Al_{43}$ selected among the Si alloys described above and further containing a conductive auxiliary agent and a binder, was subjected to performance evaluation in each of Examples.

Here, the other alloys used in the present invention other than $Si_{41}Sn_{16}Al_{43}$ (the alloys of $Si_xSn_yAl_zA_a$, $Si_xSn_yV_zA_a$ and $Si_xSn_yC_zA_a$ other than $Si_{41}Sn_{16}Al_{43}$) can obtain the results identical or similar to those of the following examples using $Si_{41}Sn_{16}Al_{43}$. The reason thereof is that, as shown in the reference examples, the other alloys used in the present invention have characteristics similar to those of

TABLE 3

| | Composition | | | 1st Cycle Discharge Capacity | 50th Cycle Discharge Capacity Retention Rate | 100th Cycle Discharge Capacity Retention Rate |
|---|---|---|---|---|---|---|
| | Si (%) | Sn (%) | C (%) | (mAh/g) | (%) | (%) |
| Reference Example 28 | 63 | 23 | 14 | 2134 | 92 | 45 |
| Reference Example 29 | 57 | 21 | 22 | 2005 | 92 | 47 |
| Reference Example 30 | 50 | 19 | 31 | 1632 | 92 | 48 |
| Reference Example 31 | 48 | 18 | 34 | 1628 | 92 | 49 |
| Reference Example 32 | 44 | 17 | 39 | 1571 | 92 | 50 |
| Reference Example 33 | 38 | 14 | 48 | 1262 | 92 | 51 |
| Reference Example 34 | 50 | 39 | 11 | 1710 | 92 | 48 |
| Reference Example 35 | 46 | 36 | 18 | 1582 | 96 | 49 |
| Reference Example 36 | 39 | 31 | 30 | 1310 | 95 | 52 |
| Reference Example 37 | 35 | 28 | 37 | 1250 | 92 | 52 |
| Reference Example 38 | 33 | 25 | 42 | 1089 | 92 | 52 |
| Reference Example 39 | 40 | 48 | 12 | 1741 | 97 | 55 |
| Reference Example 40 | 39 | 46 | 15 | 1685 | 98 | 56 |
| Reference Example 41 | 36 | 44 | 20 | 1583 | 97 | 57 |
| Reference Example 42 | 35 | 43 | 22 | 1525 | 96 | 55 |
| Reference Example 43 | 34 | 41 | 25 | 1466 | 99 | 60 |
| Reference Example 44 | 33 | 40 | 27 | 1456 | 97 | 57 |
| Reference Example 45 | 32 | 39 | 29 | 1423 | 96 | 57 |
| Reference Example 46 | 32 | 38 | 30 | 1403 | 97 | 58 |
| Reference Example 47 | 31 | 37 | 32 | 1381 | 98 | 60 |
| Reference Example 48 | 29 | 35 | 36 | 1272 | 97 | 60 |
| Reference Example 49 | 29 | 34 | 37 | 1184 | 98 | 59 |
| Comparative Reference Example 29 | 100 | 0 | 0 | 3232 | 47 | 22 |
| Comparative Reference Example 30 | 89 | 11 | 0 | 3149 | 78 | 36 |
| Comparative Reference Example 31 | 77 | 23 | 0 | 2622 | 84 | 38 |
| Comparative Reference Example 32 | 56 | 44 | 0 | 1817 | 91 | 42 |
| Comparative Reference Example 33 | 45 | 55 | 0 | 1492 | 91 | 42 |
| Comparative Reference Example 34 | 38 | 62 | 0 | 1325 | 91 | 42 |
| Comparative Reference Example 35 | 95 | 0 | 5 | 3284 | 58 | 37 |
| Comparative Reference Example 36 | 84 | 0 | 16 | 3319 | 64 | 38 |
| Comparative Reference Example 37 | 72 | 0 | 28 | 3319 | 51 | 29 |
| Comparative Reference Example 38 | 70 | 0 | 30 | 3409 | 68 | 33 |
| Comparative Reference Example 39 | 67 | 0 | 33 | 3414 | 54 | 27 |
| Comparative Reference Example 40 | 63 | 0 | 37 | 3360 | 59 | 27 |

In summary, it was confirmed that the batteries of the reference examples each using the Si—Sn—C alloy as a negative electrode active material containing 29% by mass or greater of Si and the residue of Sn, C and inevitable impurities, each had a high initial capacity exceeding at least 1000 mAh/g, and showed discharge capacity retention rates of 92% or higher after 50 cycles and 45% or higher even after 100 cycles.

$Si_{41}Sn_{16}Al_{43}$. That is, the alloys having similar characteristics can obtain similar results even if the type of the alloys is changed.

In each of the following examples and comparative examples, the negative electrode for an electric device containing the negative electrode active material using $Si_{41}Sn_{16}Al_{43}$ selected among the Si alloys described above and changing the type of current collectors (elastic elongation), was subjected to performance evaluation.

Example 1

Production of Si Alloy

The Si alloy described above was produced by a mechanical alloying method (or an arc plasma melting method). In particular, the Si alloy was obtained in a manner such that a planetary ball mill P-6 (manufactured by Fritsch, Germany) was used, and zirconia pulverization balls and raw material powder of each alloy were put into a zirconia pulverizing pot so as to subject the mixture to alloying processing at 600 rpm and for 48 hours.

Production of Negative Electrode

Example 1

First, 80 parts by mass of a negative electrode active material, 5 parts by mass of a conductive auxiliary agent and 15 parts by mass of a binder were mixed in N-methyl-2-pyrrolidone (NMP) as a solvent so as to prepare negative electrode active material slurry. In this example, the Si alloy powder ($Si_{41}Sn_{16}Al_{43}$; average particle diameter of primary particles: 0.3 μm) prepared above was used as the negative electrode active material. In addition, short-chain acetylene black as short-chain carbon black was used as the conductive auxiliary agent, and polyimide was used as the hinder.

Next, a copper alloy foil (copper alloy 1: Cu to which approximately 0.3% by mass of each of Cr, Sn and Zn was added) having a thickness of 10 Mm. 1.43% of elastic elongation and 580 N/mm² of tensile strength was prepared.

In this example, the elastic elongation (%) and the tensile strength (N/mm²) of the current collector were measured by use of a digital material testing machine 5565 (manufactured by Instron) at a velocity of 10 mm/min and a chuck interval of 50 mm. The sample used was a current collecting foil formed into a wedge having a total length of 7 mm and a parallel part width of 5 mm.

The prepared negative electrode active material slurry was applied evenly to both surfaces of the copper alloy foil (copper alloy 1) in a manner such that the thickness thereof on each side after drying was 50 μm, and then dried in a vacuum for 24 hours so as to obtain a negative electrode.

Example 2

A negative electrode of this example was produced in the same manner as Example 1 except that a copper alloy foil (copper alloy 2: Cu to which approximately 0.3% by mass of Zr was added) having a thickness of 10 μm, 1.53% of elastic elongation and 450 N/mm² of tensile strength was used as the negative electrode current collector.

Example 3

A negative electrode of this example was produced in the same manner as Example 1 except that a copper alloy foil (copper alloy 3: Cu to which approximately 0.1% by mass of Zr was added) having a thickness of 10 μm, 1.39% of elastic elongation and 420 N/mm² of tensile strength was used as the negative electrode current collector.

Comparative Example 1

A negative electrode of this example was produced in the same manner as Example 1 except that a copper foil (tough pitch copper: Cu with purity of 99.9% by mass or higher) having a thickness of 10 μm, 1.28% of elastic elongation and 139 N/mm² of tensile strength was used as the negative electrode current collector.

Comparative Example 2

A negative electrode of this example was produced in the same manner as Comparative Example 1 except that 80 parts by mass of silicon (pure Si) powder (purity: 99.999% by mass; average particle diameter of primary particles: 45 μm) was used as the negative electrode active material.

Comparative Example 3

A negative electrode of this example was produced in the same manner as Comparative Example 2 except that polyvinylidene fluoride (PVdF) was used as the binder material.

[Production of Positive Electrode]

As a positive electrode active material, $Li_{1.85}Ni_{0.18}Co_{0.10}Mn_{0.87}O_3$ was prepared in a manner described in Example 1 (paragraph [0046]) of JP 2012-185913 A. Next, 90 parts by mass of the positive electrode active material thus obtained, 5 parts by mass of acetylene black as a conductive auxiliary agent and 5 parts by mass of polyvinylidene fluoride as a binder were mixed together and dispersed in N-methyl pyrrolidone to prepare positive electrode slurry. The positive electrode slurry thus obtained was applied evenly to both surfaces of a positive electrode current collector formed of an aluminum foil in a manner such that the thickness of a positive electrode active material layer on each side was 30 μm, and then dried so as to obtain a positive electrode.

[Production of Battery]

The produced positive electrode was placed to face the negative electrode, and a separator (polyolefin, film thickness: 20 μm) was interposed therebetween. A stacked body of the negative electrode, the separator and the positive electrode was placed on the bottom side of a coin cell (CR2032; material: stainless steel (SUS316)). Further, a gasket was attached thereto in order to ensure insulation between the positive electrode and the negative electrode, an electrolysis solution described below was injected therein by use of a syringe, a spring and a spacer were stacked thereon, and an upper member of the coin cell was placed over and cramped to seal so as to obtain a lithium ion secondary battery for each example.

The electrolysis solution used was prepared in a manner such that lithium hexafluorophosphate ($LiPF_6$) as supporting salt was dissolved, at a concentration of 1 mol/L, into an organic solvent in which ethylene carbonate (EC) and diethyl carbonate (DEC) were mixed in a ratio of 1:2 (volume ratio).

[Charge-discharge Test of Battery]

The charge-discharge test was performed on the respective batteries in the same manner as Reference Example A.

The respective batteries were charged and discharged by use of a charge-discharge tester (HJ0501SM8A manufactured by Hokuto Denko Corporation) in a thermostat bath (PFU-3K manufactured by ESPEC Corp.) set at 300 K (27° C.). In particular, the respective batteries were charged at 0.1 mA from 2 V to 10 mV in a constant-current/constant-voltage mode during charging (in the process of Li intercalation to the negative electrode as an evaluation target). Subsequently, the respective batteries were discharged at 0.1 mA from 10 mV to 2 V in a constant-current mode during discharging (in the process of Li release from the negative electrode). This procedure, which is regarded as a single charge-discharge cycle, was repeated 50 times.

Thereafter, a discharge capacity at the 50th cycle was obtained, and a discharge capacity retention rate (%) at the 50th cycle with respect to the discharge capacity at the 1st cycle was calculated. Here, "the discharge capacity retention rate (%)" at the 50th cycle represents an index for "how much of the initial capacity is maintained." The discharge capacity retention rate (%) was calculated according to the following formula.

$$\text{Discharge capacity retention rate (\%)} = (\text{discharge capacity at 50th cycle})/(\text{discharge capacity at 1st cycle}) \times 100 \quad [\text{Math 2}]$$

Figure 18:
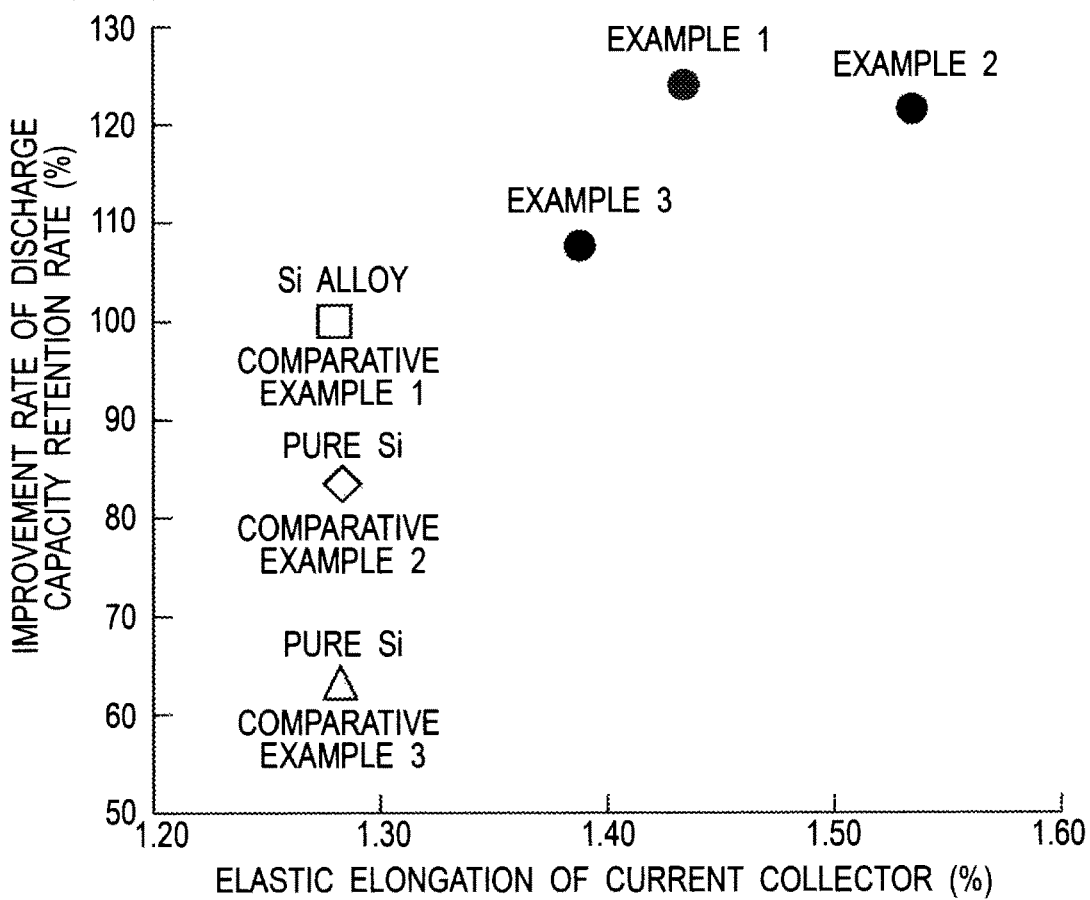
FIG. 18 is a diagram showing a relationship between elastic elongation of a negative electrode current collector and an improvement rate of a discharge capacity retention rate of a battery of each of examples.

Table 4 and FIG. 18 show the results of the obtained discharge capacity retention rates (%) indicated by values normalized in a manner such that the discharge capacity retention rate of Comparative Example 1 is readjusted to 100 (an improvement rate (%) of the discharge capacity retention rate).

follow such a larger volumetric change of the negative electrode active material layer, which may be the reason why the capacity was decreased significantly.

The battery of Comparative Example 3 using PVdF as the binder in the negative electrode active material layer showed a much lower discharge capacity retention rate. This may be because the binder could not follow the expansion-contraction of the active material in association with charge and discharge since the elastic modulus of PVdF (1.0 GPa) used as the binder in Comparative Example 3 was lower than the elastic modulus of polyimide (3.73 GPa) used in Examples 1 to 3 and Comparative Examples 1 and 2, which resulted in an increase of the volumetric change of the negative electrode active material layer. As a result, the current collector could not follow the volumetric change of the negative electrode active material layer, which may be the reason why the capacity was decreased more remarkably.

TABLE 4

| | Active Material | Conductive Auxiliary Agent | Binder | Current Collector | Elastic Elongation of Current Collector (%) | Tensile Strength of Current Collector (N/mm²) | Improvement Rate of Discharge Capacity Retention Rate (%) |
|---|---|---|---|---|---|---|---|
| Example 1 | Si Alloy | Short-Chain Carbon Black | Polyimide | Copper Alloy 1 | 1.43 | 580 | 124 |
| Example 2 | Si Alloy | Short-Chain Carbon Black | Polyimide | Copper Alloy 2 | 1.53 | 450 | 122 |
| Example 3 | Si Alloy | Short-Chain Carbon Black | Polyimide | Copper Alloy 3 | 1.39 | 420 | 108 |
| Comparative Example 1 | Si Alloy | Short-Chain Carbon Black | Polyimide | Tough Pitch Copper | 1.28 | 139 | 100 |
| Comparative Example 2 | Pure Si | Short-Chain Carbon Black | Polyimide | Tough Pitch Copper | 1.28 | 139 | 84 |
| Comparative Example 3 | Pure Si | Short-Chain Carbon Black | PVdF | Tough Pitch Copper | 1.28 | 139 | 63 |

The tests revealed according to Table 4 and FIG. 18 that the batteries of Examples 1 to 3 each using the current collector having the elastic elongation of 1.30% or higher exhibited a high discharge capacity retention rate compared with the batteries of Comparative Examples 1 to 3. The reason thereof may be that the current collector used in each of Examples 1 to 3 elastically followed the volumetric change of the negative electrode active material layer containing the Si alloy in association with charge and discharge so as to suppress deformation of the electrode layer. Particularly, the batteries of Examples 1 and 2 each using the current collector having the elastic elongation of 1.40% or greater or 1.50% or greater exhibited a much higher discharge capacity retention rate.

On the other hand, in the battery of Comparative Example 1 using the current collector having a predetermined value or lower of the elastic deformation, the current collector was easily subjected to plastic deformation in association with the volumetric change of the negative electrode active material layer in association with charge and discharge. As a result, the negative electrode active material layer was distorted, and it was difficult to keep an even distance between the negative electrode and the positive electrode. This may be the reason why the battery could not ensure a high discharge capacity retention rate.

In the battery of Comparative Example 2 using pure Si as the negative electrode active material, the volumetric change of the negative electrode active material layer due to expansion-contraction of the negative electrode active material in association with charge and discharge of the battery, is larger than that of the Si alloy. Thus, the current collector could not This application claims the benefit of priority from Japanese Patent Application No. P2012-256937, filed on Nov. 22, 2012, the entire contents of all of which are incorporated herein by reference.

REFERENCE SIGNS LIST 10, 50 LITHIUM ION SECONDARY BATTERY (LAMINATED BATTERY)
11 POSITIVE ELECTRODE CURRENT COLLECTOR
12 NEGATIVE ELECTRODE CURRENT COLLECTOR
13 POSITIVE ELECTRODE ACTIVE MATERIAL LAYER
15 NEGATIVE ELECTRODE ACTIVE MATERIAL LAYER
17 ELECTROLYTE LAYER
19 SINGLE CELL LAYER
21, 57 POWER GENERATION ELEMENT
25, 58 POSITIVE ELECTRODE CURRENT COLLECTING PLATE
27, 59 NEGATIVE ELECTRODE CURRENT COLLECTING PLATE
29, 52 BATTERY EXTERIOR MEMBER (LAMINATED FILM)

The invention claimed is:
1. A negative electrode for an electric device, comprising:
a current collector; and
an electrode layer containing a negative electrode active material, a conductive auxiliary agent and a binder and formed on a surface of the current collector, wherein the negative electrode active material contains an alloy represented by the following formula (1):

$$Si_xSn_yV_zA_a \quad (1)$$

in the formula (1),
A is inevitable impurity,
x, y, z and a represent mass percent values and satisfy conditions of $27 \leq x < 100$, $0 < y \leq 73$, $0 < z \leq 73$, $0 \leq a < 0.5$, and $x+y+z+a=100$,
elastic elongation of the current collector at an elastic limit is greater than or equal to 1.39%,
a thickness of the current collector is in a range from 5 μm to 15 μm, and
the current collector comprises a copper alloy foil including at least one of Cr, Sn, Zn, or Zr.

2. The negative electrode for an electric device according to claim 1, wherein x is 84 or less, y is 10 or greater and 73 or less, and z is 6 or greater and 73 or less.

3. The negative electrode for an electric device according to claim 2, wherein y is 10 or greater and 63 or less, and z is 6 or greater and 63 or less.

4. The negative electrode for an electric device according to claim 3, wherein x is 52 or less.

5. The negative electrode for an electric device according to claim 4, wherein y is 40 or less, and z is 20 or greater.

6. The negative electrode for an electric device according to claim 1, wherein the elastic elongation of the current collector at the elastic limit is 1.40% or greater.

7. The negative electrode for an electric device according to claim 1, wherein a tensile strength of the current collector is 150 N/mm² or higher.

8. The negative electrode for an electric device according to claim 1, wherein a tensile strength of the current collector is 420 N/mm² or higher.

9. The negative electrode for an electric device according to claim 1, wherein an elastic modulus of the binder is 3.73 GPa or higher.

10. The negative electrode for an electric device according to claim 1, wherein the current collector comprises the copper alloy foil including Cr, Sn, and Zn.

11. The negative electrode for an electric device according to claim 1, wherein the current collector comprises the copper alloy foil including Zr.

* * * * *